United States Patent
Han et al.

(10) Patent No.: US 8,855,073 B2
(45) Date of Patent: Oct. 7, 2014

(54) METHOD AND APPARATUS FOR PERFORMING CONTENTION-BASED UPLINK TRANSMISSION IN A WIRELESS COMMUNICATION SYSTEM

(75) Inventors: Seung Hee Han, Gyeongki-do (KR); Jae Hoon Chung, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 13/511,035

(22) PCT Filed: Nov. 9, 2010

(86) PCT No.: PCT/KR2010/007855
§ 371 (c)(1),
(2), (4) Date: Jun. 19, 2012

(87) PCT Pub. No.: WO2011/062393
PCT Pub. Date: May 26, 2011

(65) Prior Publication Data
US 2012/0287877 A1 Nov. 15, 2012

Related U.S. Application Data

(60) Provisional application No. 61/263,406, filed on Nov. 23, 2009, provisional application No. 61/266,155, filed on Dec. 2, 2009.

(30) Foreign Application Priority Data

Nov. 8, 2010 (KR) .......... 10-2010-0110329

(51) Int. Cl.
*H04W 4/00* (2009.01)
*H04W 74/08* (2009.01)
*H04W 74/00* (2009.01)
*H04W 52/02* (2009.01)
*H04W 72/04* (2009.01)

(52) U.S. Cl.
CPC .......... *H04W 74/002* (2013.01); *H04W 72/042* (2013.01); *H04W 74/08* (2013.01); *H04W 74/0833* (2013.01); *H04W 52/0216* (2013.01)
USPC ....................................................... 370/329

(58) Field of Classification Search
CPC ..................................................... H04W 28/04
USPC .......................... 370/329, 350, 216, 335, 336; 455/452.1, 450, 509, 452
See application file for complete search history.

(56) References Cited

U.S. PATENT DOCUMENTS 8,516,327 B2 * 8/2013 Kim et al. ..................... 714/749
2007/0155390 A1 * 7/2007 Kodikara Patabandi et al. ............................. 455/450

(Continued)

FOREIGN PATENT DOCUMENTS

WO 2009-107947 A1 9/2009

OTHER PUBLICATIONS

R2-096037, "Discussion on Contention Resolution Procedure," 3GPP TSG-RAN WG2 Melting #67bis, Oct. 12-16, 2009.

(Continued)

*Primary Examiner* — Chirag Shah
*Assistant Examiner* — Jael Ulysse
(74) *Attorney, Agent, or Firm* — Morgan, Lewis & Bockius LLP

(57) ABSTRACT

The present invention provides a method and apparatus for performing contention-based uplink transmission in a wireless communication system. A terminal transmits a contention-based uplink signal to a base station. The base station detects a contention-based uplink signal that is transmitted from at least one terminal, and determines whether there exists a terminal corresponding to the detected contention-based uplink signal. The terminal receives an uplink (UL) grant from the base station. The terminal switches from a dormant station into an active state, based on the uplink grant. Here, the dormant state is a state where radio resource control connection is formed between the base station and the terminal but data is not actually transmitted, and the active state is a state where data transmission is actually performed.

7 Claims, 28 Drawing Sheets

(56) References Cited

U.S. PATENT DOCUMENTS

| | | |
|---|---|---|
| 2008/0259862 A1* | 10/2008 | Yeo et al. .................... 370/329 |
| 2008/0267165 A1* | 10/2008 | Bertrand et al. ............. 370/350 |
| 2009/0116434 A1* | 5/2009 | Lohr et al. ................... 370/329 |
| 2009/0213818 A1* | 8/2009 | Park et al. .................... 370/336 |
| 2009/0245187 A1* | 10/2009 | Nam et al. .................... 370/329 |
| 2009/0268685 A1* | 10/2009 | Chen et al. ................... 370/329 |
| 2010/0172308 A1* | 7/2010 | Nam et al. .................... 370/329 |
| 2011/0039568 A1* | 2/2011 | Zhang et al. ................ 455/452.1 |
| 2011/0176502 A1* | 7/2011 | Chung et al. ................. 370/329 |
| 2011/0230199 A1* | 9/2011 | Patabandi et al. ............ 455/450 |
| 2011/0292895 A1* | 12/2011 | Wager et al. ................. 370/329 |
| 2011/0305134 A1* | 12/2011 | Chung et al. ................. 370/216 |
| 2012/0033643 A1* | 2/2012 | Noh et al. ..................... 370/335 |
| 2012/0201219 A1* | 8/2012 | Wager et al. ................. 370/329 |
| 2012/0220327 A1* | 8/2012 | Lee et al. ..................... 455/509 |

OTHER PUBLICATIONS

R2-091216, "UL Grant Misuse after Contention Resolution," 3GPP TSG-RAN2 WG2 Meeting #65, Feb. 9-13, 2009.
International Search Report issued in corresponding PCT International Application No. PCT/KR2010/007855 mailed Jul. 21, 2011.

* cited by examiner

FIG. 8
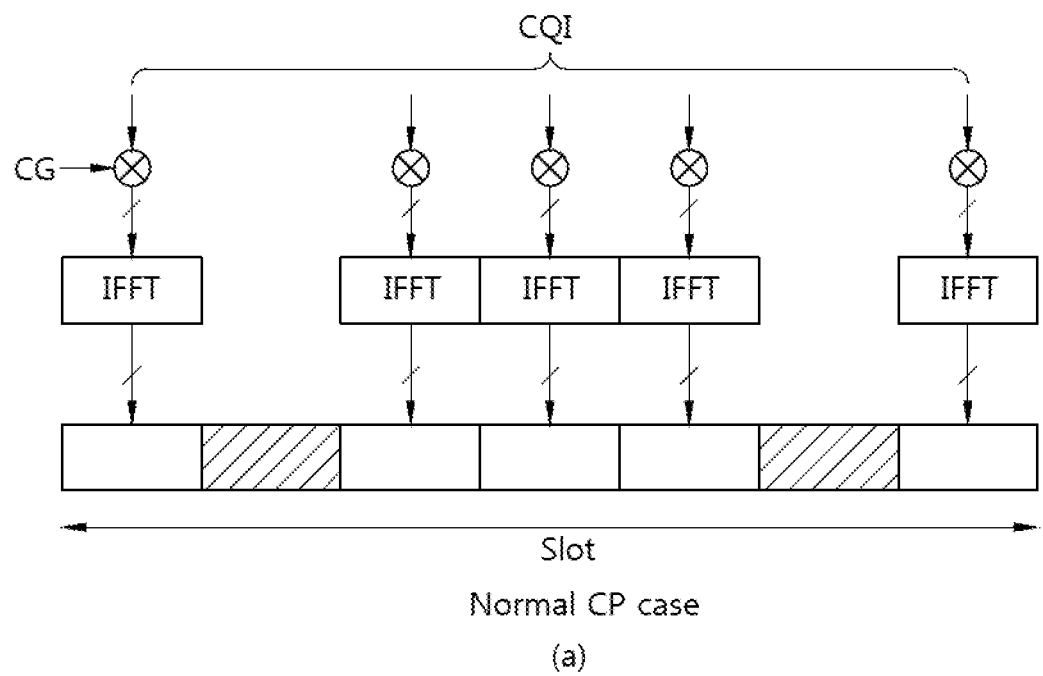
Slot
Normal CP case
(a)
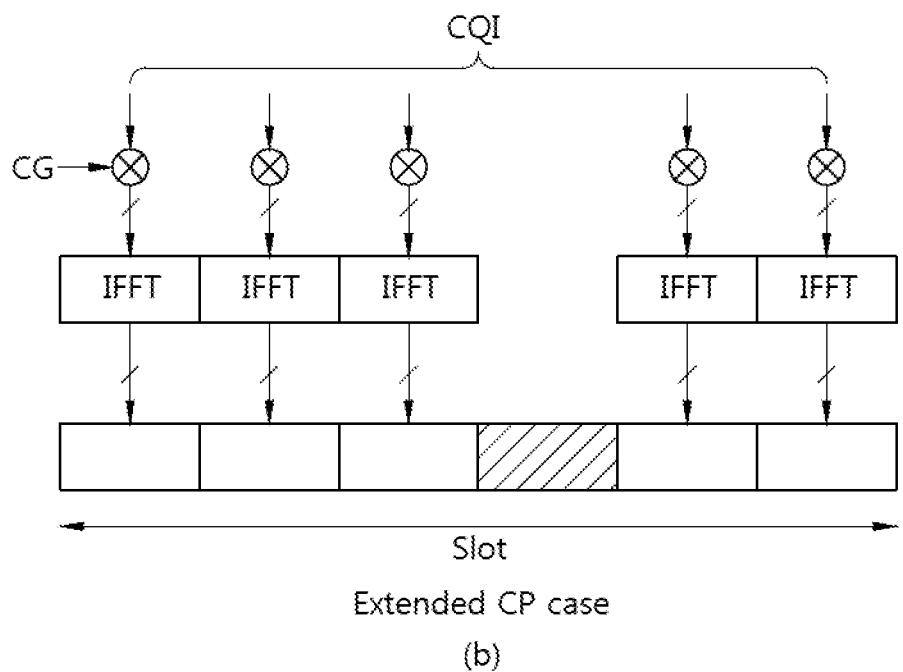
Slot
Extended CP case
(b)

FIG. 15
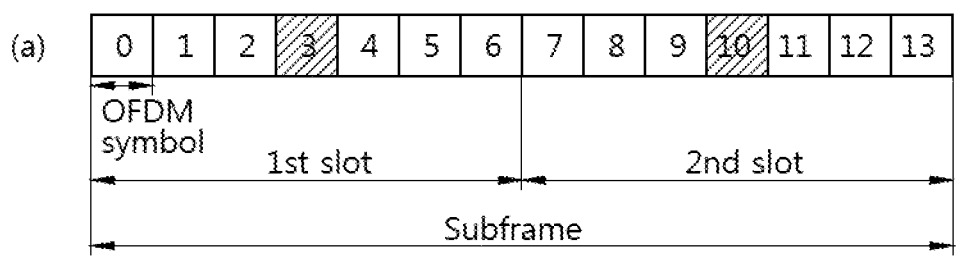
 RS
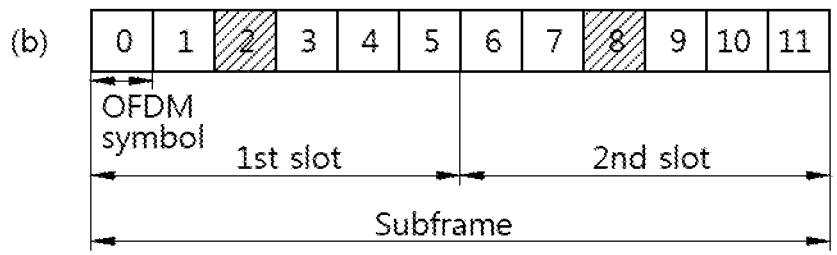
 RS
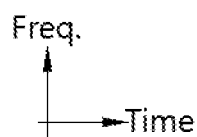

METHOD AND APPARATUS FOR PERFORMING CONTENTION-BASED UPLINK TRANSMISSION IN A WIRELESS COMMUNICATION SYSTEM

This is a U.S. National Phase Entry of PCT Application No. PCT/KR2010/007855, filed Nov. 9, 2010, and claims the benefit of Korean Patent Application 10-2010-0110329filed Nov. 8, 2010, U.S. Provisional Application Ser. No. 61/266,155 filed Dec. 2, 2009 and U.S. Provisional Application Ser. No. 61/263,406 filed Nov. 23, 2009, the disclosures of which are incorporated herein by reference in their entireties.

BACKGROUND OF THE INVENTION

1. Field of the Invention

The present invention relates to wireless communications, and more particularly, to a method and apparatus for performing contention-based uplink transmission in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

Meanwhile, a control plane (C-plane) can be classified into an idle mode and a connected mode. The idle mode is a state in which an RRC connection is not established, that is, a UE and a BS are not connected to each other. The connected mode is a state in which the RRC connection has already been established between the UE and the BS. Since the connection is established between the BS and the UE, data can be transmitted or received bi-directionally. In addition, a dormant state and an active state can be defined to minimize power consumption of the UE in the connected mode. If there is no data transmission/reception during a time greater than or equal to a specific time in the active state in which the data is actually transmitted or received, the UE transitions from the active state to the dormant state to minimize power consumption. In the dormant state, the UE needs to rapidly transition to the active state whenever data transmission is necessary. 3rd generation partnership project (3GPP) long term evolution (LTE)-Advanced (A) requires that a transition time from the dormant state to the active state is less than or equal to 10 ms.

In general, the transition from the dormant state to the active state and started by uplink transmission can be started when the UE transmits a scheduling request (SR) to the BS. However, the SR can be transmitted only in a specific designated subframe, and in this case, a transition time is also increased by a time of waiting for the specific subframe. Therefore, there is a need to perform contention-based uplink transmission in which a transition to the activate state can be achieved without SR transmission.

SUMMARY OF THE INVENTION

The present invention provides a method and apparatus for performing contention-based uplink transmission in a wireless communication system.

In an aspect, a method of transiting a state in a wireless communication system is provided. The method includes transmitting a contention-based uplink (UL) signal to a base station, receiving a UL grant from the base station, and transitioning from a dormant state to an active state based on the UL grant, wherein the dormant state is a state in which a radio resource control (RRC) connection is established between the base station and a user equipment but data is not actually transmitted, and wherein the active state is a state in which data transmission is actually performed.

The method may further include receiving an acknowledgment (ACK)/non-acknowledgement (NACK) from the base station in response to the contention-based UL signal. The ACK/NACK mat be received through a physical hybrid ARQ indicator channel (PHICH) defined in $3^{rd}$ generation partnership project (3GPP) long term evolution (LTE) rel-8. The ACK/NACK may be received by being included in the UL grant.

The contention-based UL signal may include at least one of data or a signal indicating a buffer status of the user equipment.

The contention-based UL signal may be transmitted through a physical uplink control channel (PUCCH). The contention-based UL signal may be transmitted through the PUCCH based on a PUCCH format 2.

The contention-based UL signal may be transmitted through a physical uplink shared channel (PUSCH).

The method may further include transmitting a reference signal (RS) to detect the contention-based UL signal of the base station. A cyclic shift value of the RS may be randomly selected by the user equipment. A cyclic shift value of the RS may be predetermined or is signaled by RRC signaling.

The contention-based UL signal may be transmitted through a resource reserved in a time domain or a frequency domain.

In another aspect, a method of performing contention-based uplink (UL) transmission in a wireless communication system is provided. The method includes detecting a contention-based UL signal transmitted from at least one user equipment, determining whether a user equipment corresponding to the detected contention-based UL signal is present or not, and transmitting a UL grant to the corresponding user equipment.

In another aspect, a user equipment includes a radio frequency (RF) unit transmitting or receiving a radio signal, and a processor coupled to the RF unit, wherein the processor is configured for transmitting a contention-based uplink (UL) signal to a base station, receiving a UL grant from the base station, and transitioning from a dormant state to an active state based on the UL grant, wherein the dormant state is a state in which a radio resource control (RRC) connection is established between the base station and a user equipment but data is not actually transmitted, and wherein the active state is a state in which data transmission is actually performed.

A transition time required when a user equipment transitions from a dormant state to an active state in a connected mode of a control plane (C-plane) can be minimized to a level less than or equal to that required by a $3^{rd}$ generation partnership project (3GPP) long term evolution (LTE)-advanced (A).

BRIEF DESCRIPTION OF THE DRAWINGS

FIG. 8 shows a PUCCH format 2/2a/2b.
FIG. 15 shows examples of a subframe through which a reference signal is transmitted.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
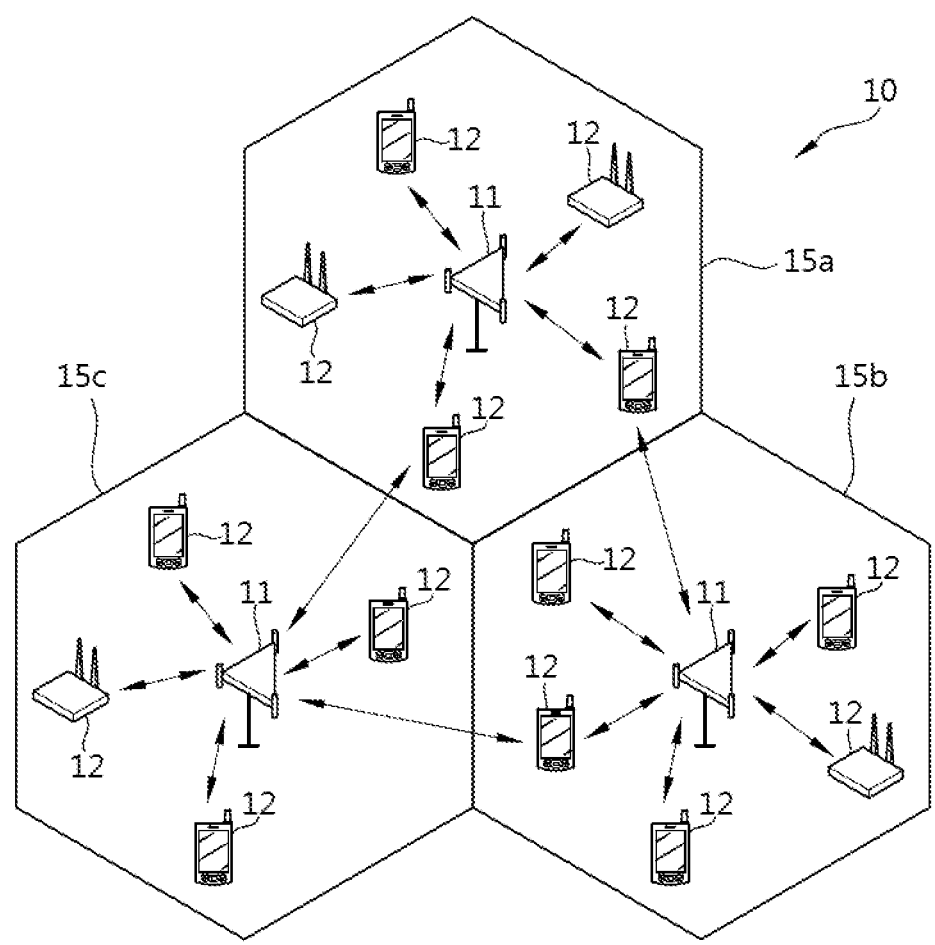
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
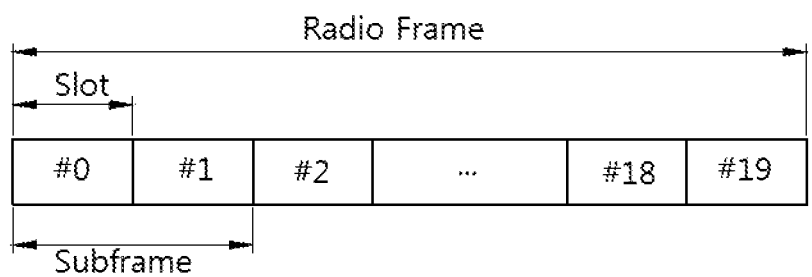
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
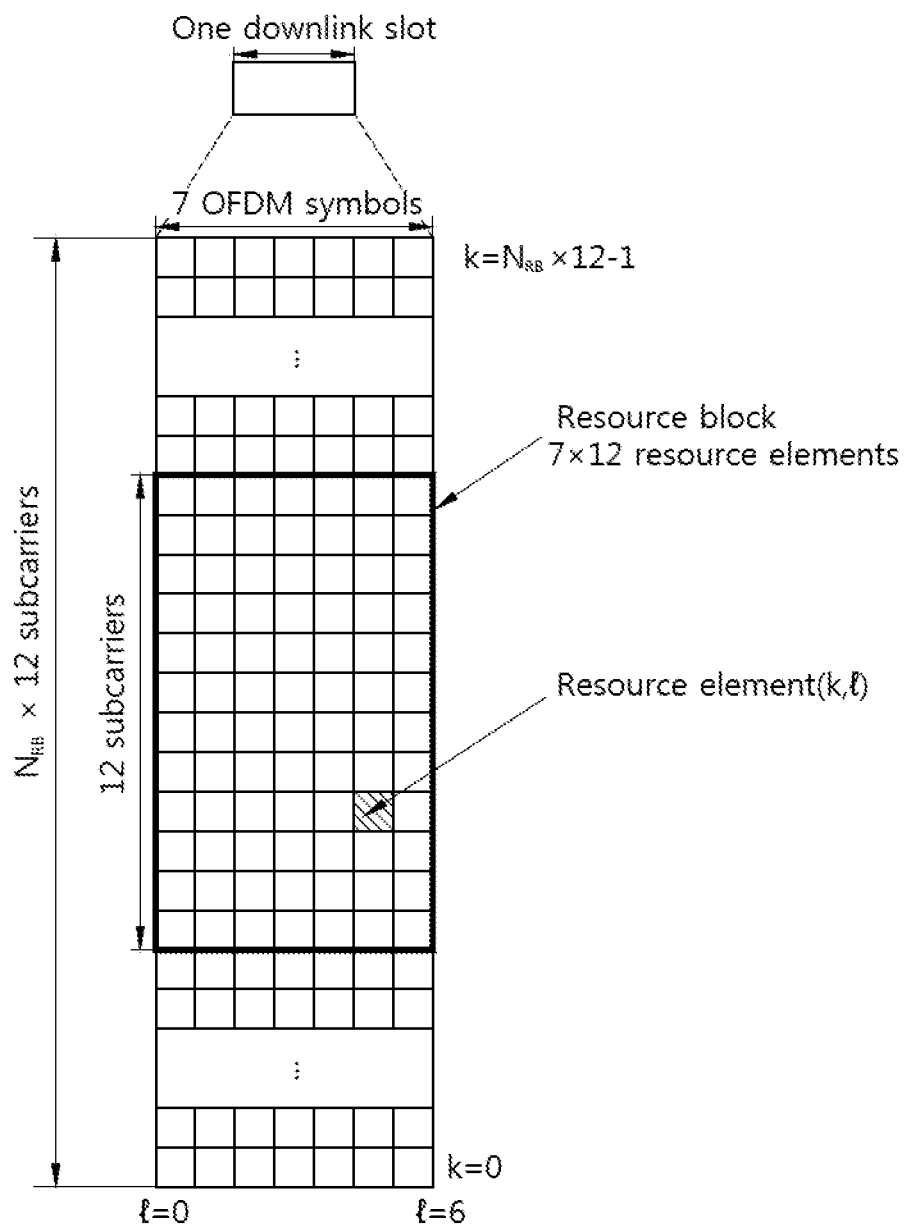
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
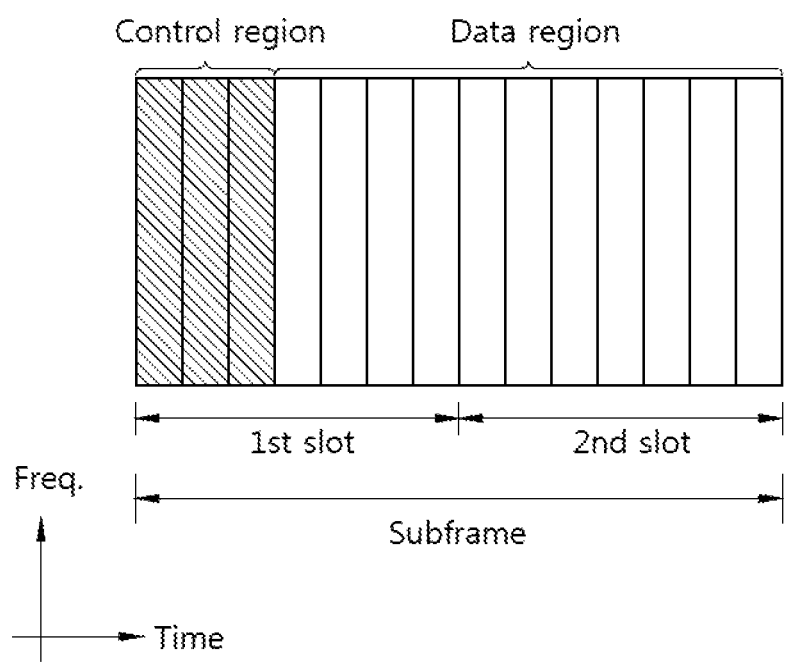
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
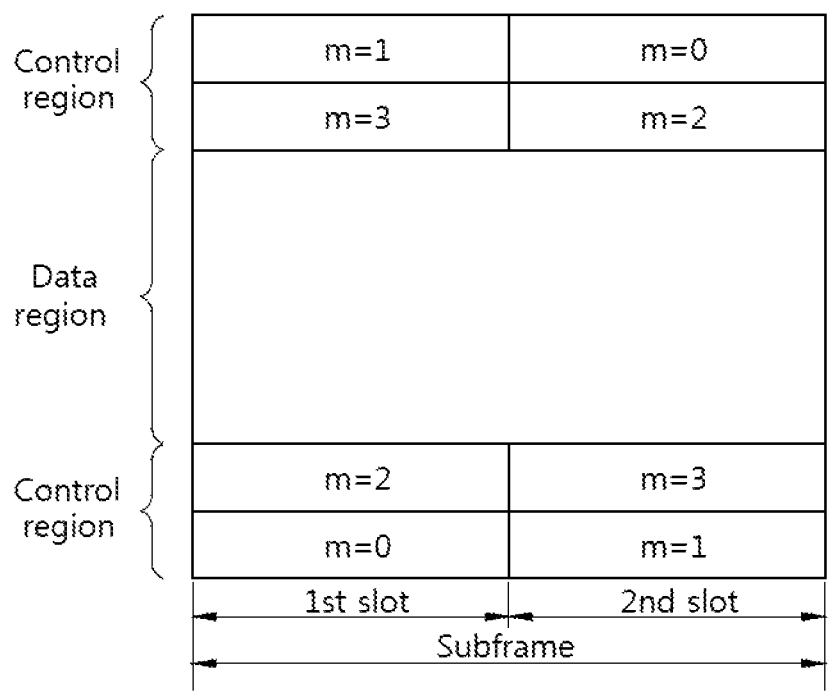
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. The user equipment does not transmit the PUCCH and the PUSCH simultaneously to maintain a single carrier property.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated by using bit phase shift keying (BPSK) with respect to one codeword. A PUCCH format 1b carries an ACK/NACK modulated by using quadrature phase shift keying (QPSK) with respect to two codewords. A PUCCH format 2 carries a channel quality indicator (CQI) modulated by using QPSK. PUCCH formats 2a and 2b carry CQI and ACK/NACK.

Table 1 shows a modulation scheme and the number of bits in a subframe according to a PUCCH format.

TABLE 1

| PUCCH format | Modulation scheme | Number of bits per sub frame, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a PUCCH demodulation reference signal per slot.

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

Table 3 shows a position of an OFDM symbol to which a demodulation reference signal is mapped according to a PUCCH format.

TABLE 3

| | set of values for l | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

ACK/NACK signals can be transmitted by using different resources including different cyclic shift values and different Walsh/discrete Fourier transform (DFT) orthogonal codes by using a computer generated constant amplitude zero auto correlation (CG-CAZAC) sequence for each UE. If an available cyclic shift value is 6 and the number of Walsh/DFT codes is 3, 18 UEs having a signal antenna port can be multiplexed in one PRB.

The UE can transmit an SR when a resource for UL data transmission is required. That is, SR transmission is event-triggered. For SR transmission, the UE receives an sr-PUCCH-ResourceIndex parameter and an sr-ConfigIndex parameter $I_{SR}$ indicating an SR configuration index by using a radio resource control (RRC) message. $SR_{PERIODICITY}$ indicating a period for SR transmission and $N_{OFFSET,SR}$ indicating a subframe for SR transmission can be configured by the sr-ConfigIndex parameter. That is, the SR is transmitted in a specific subframe which is periodically repeated according to $I_{SR}$ given by a higher layer. In addition, as a resource for the SR, a subframe resource and a code division multiplexing (CDM)/frequency division multiplexing (FDM) resource can be allocated. Table 4 shows an SR transmission period and an SR subframe offset according to an SR configuration index.

TABLE 4

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

Figure 6:
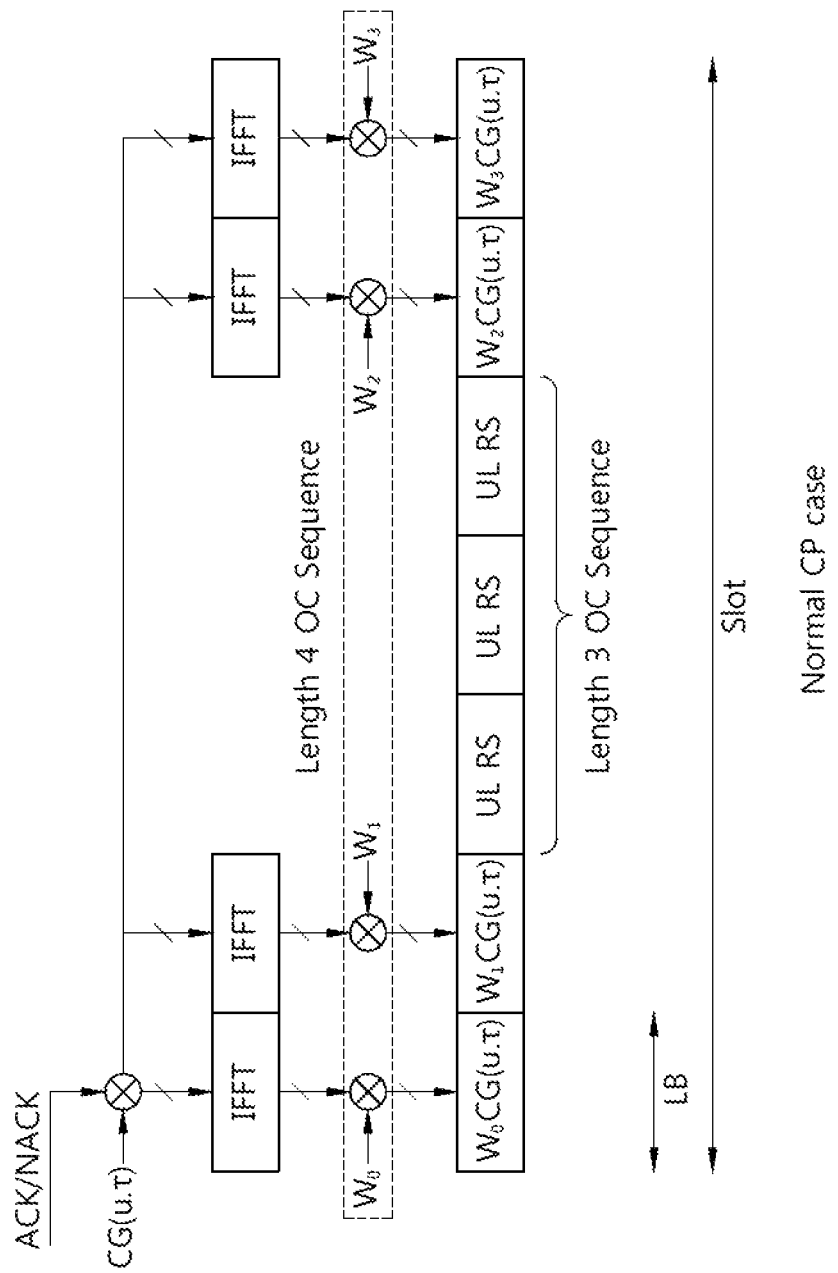
FIG. 6 shows a PUCCH format 1a/1b in a normal CP structure.

FIG. 6 shows a PUCCH format 1a/1b in a normal CP structure. Uplink reference signals are transmitted in $3^{rd}$ to $5^{th}$ SC-FDMA symbols. In FIG. 6, $w_0$, $w_1$, $w_2$ and $w_3$ can be modulated in a time domain after inverse fast Fourier transform (IFFT) modulation, or can be modulated in a frequency domain before IFFT modulation.

Figure 7:
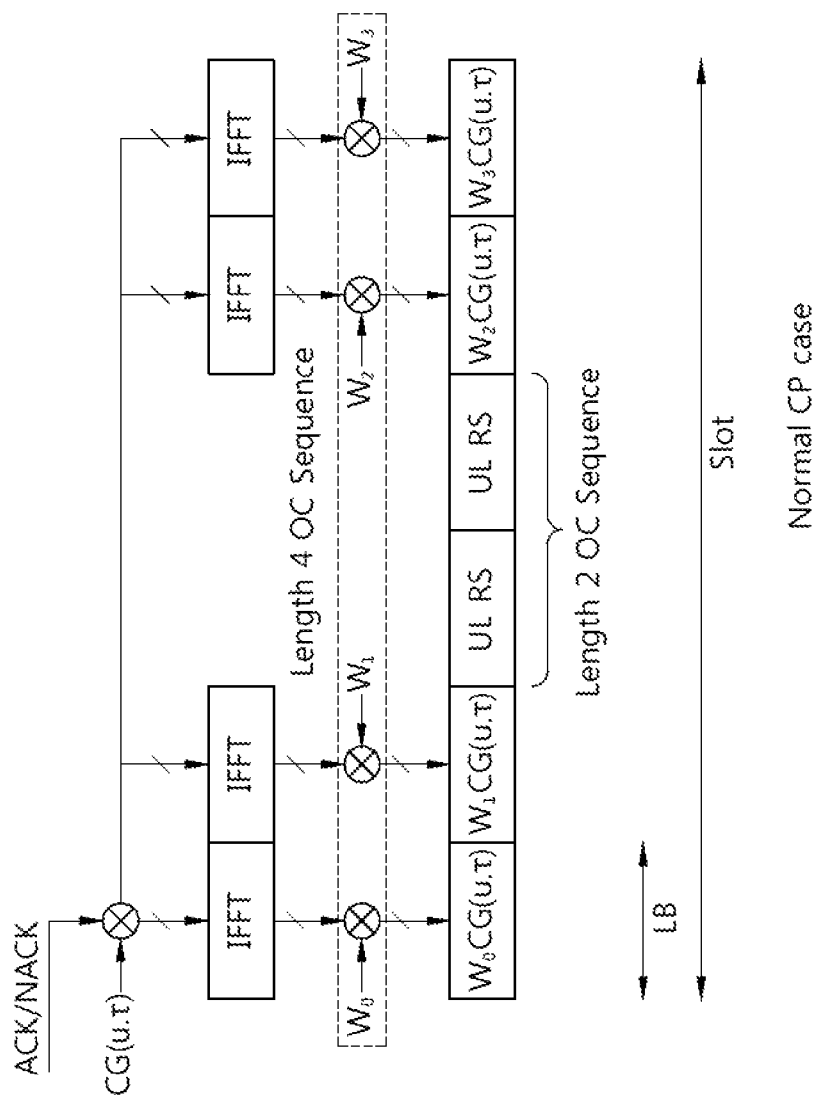
FIG. 7 shows a PUCCH format 1a/1b in an extended CP structure.

FIG. 7 shows a PUCCH format 1a/1b in an extended CP structure. Uplink reference signals are transmitted in $3^{rd}$ and $4^{th}$ SC-FDMA symbols. In FIG. 7, $w_0$, $w_1$, $w_2$ and $w_3$ can be modulated in a time domain after IFFT modulation, or can be modulated in a frequency domain before IFFT modulation.

An ACK/NACK resource including an SR, a cyclic shift assigned to the UE for persistent scheduling, a Walsh/DFT code, a PRB, or the like can be given by using RRC signaling. For non-persistent scheduling for dynamic ACK/NACK, the allocated resource can be given by a lowest CCE index of a PDCCH corresponding to a PDSCH for the ACK/NACK.

Table 5 is an example of an orthogonal sequence with a length of 4 for the PUCCH format 1/1a/1b.

TABLE 5

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

Table 6 is an example of an orthogonal sequence with a length of 3 for the PUCCH format 1/1a/1b.

TABLE 6

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 7 is an example of an orthogonal sequence for reference signal transmission in the PUCCH format 1/1a/1b.

TABLE 7

| Sequence index $n_{oc2}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 8 is an example of ACK/NACK channelization when $\Delta_{shift}^{PUCCH}=2$ in a normal CP structure.

TABLE 8

| Cell specific cyclic shift offset | | RS orthogonal cover | | | ACK/NACK orthogonal cover | | |
|---|---|---|---|---|---|---|---|
| $\delta_{offset}^{PUCCH} =$ 1 | $\delta_{offset}^{PUCCH} =$ 0 | $n_{oc}' = 0$ | $n_{oc}' = 1$ | $n_{oc}' = 2$ | $n_{oc} = 0$ | $n_{oc} = 1$ | $n_{oc} = 2$ |
| $n_{cs} = 1$ | $n_{cs} = 0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

In Table 8, $\Delta_{shift}^{PUCCH}$ is a cell-specific cyclic shift value of a CAZAC sequence, and may have any one of values 1 to 3 in a normal CP structure or an extended CP structure. $\delta_{offset}^{PUCCH}$ is a cell-specific cyclic shift offset, and may have any one of values 0 to $\Delta_{shift}^{PUCCH}-1$. Meanwhile, $n_{OC}$ is an index of an orthogonal sequence for ACK/NACK, and $n_{OC}'$ is an index of an orthogonal sequence for a reference signal. $n_{CS}$ is a cyclic shift value of a CAZAC sequence, and n' is an ACK/NACK resource index used for channelization in an RB.

Table 9 is an example of channelization of a structure in which a PUCCH format 1/1a/1b and a PUCCH format 2/2a/2b are mixed in a PRB.

TABLE 9

| | Orthogonal cover | | |
|---|---|---|---|
| Cyclic Shift | $OC_{index} = 0$ | $OC_{index} = 1$ | $OC_{index} = 2$ |
| 0 | | ACK/NACK | |
| 1 | | ACK/NACK | |
| 2 | | ACK/NACK | |
| 3 | | ACK/NACK | |
| 4 | | Guard shifts | |
| 5 | | CQI | |
| 6 | | CQI | |
| 7 | | CQI | |
| 8 | | CQI | |
| 9 | | CQI | |
| 10 | | CQI | |
| 11 | | Guard shifts | |

Referring to Table 9, cyclic shift values 0 to 3 for the PUCCH format 1/1a/1b are allocated, and cyclic shift values 5 to 10 for the PUCCH format 2/2a/2b are allocated. Cyclic shift values 4 and 11 between the PUCCH format 1/1a/1b and the PUCCH format 2/2a/2b are allocated as a guard shift.

Meanwhile, cyclic shift hopping can be performed on a symbol basis for inter-cell interference (ICI) randomization. In addition, for the ICI randomization, CS/orthogonal covering (OC) remapping can be performed between an ACK/NACK channel and a resource in a slot level.

A resource for the PUCCH format 1/1a/1b can consist of $n_{cs}$ indicating a cyclic shift in a symbol level, $n_{oc}$ indicating orthogonal covering in a slot level, and $n_{RB}$ indicating a resource block in a frequency domain. $n_r$ can be defined as an index representing the PUCCH format 1/1a/1b resources $n_{cs}$, $n_{oc}$, $n_{RB}$. That is, $n_r=(n_{cs}, n_{oc}, n_{RB})$.

The PUCCH format 2/2a/2b can carry control information such as a CQI, a precoding matrix indicator (PMI), a rank indicator (RI), CQI+ACK/NACK, etc. A Reed-Muller (RM) channel coding scheme can be applied to the PUCCH format 2/2a/2b.

Table 10 shows an example of a (20, A) RM code used in channel coding of uplink control information (UCI) of 3GPP LTE. A bit-stream $a_0, a_1, a_2, \ldots, a_{A-1}$ is used as an input of a channel coding block using the (20, A) RM code of Table 10.

TABLE 10

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel encoding bits $b_0, b_1, b_2, \ldots, b_{B-1}$ can be generated by Equation 1 below.

$$b_i = \sum_{n=0}^{A-1} (a_n \cdot M_{i,n}) \bmod 2 \quad \langle\text{Equation 1}\rangle$$

In Equation 1, i=0, 1, 2, ..., B−1.

Table 11 shows an example of a size of a CQI feedback UCI field for wideband reporting. Table 11 is a case where a single-antenna port is assumed, and transmit diversity or open-loop spatial multiplexing PDSCH transmission is assumed.

TABLE 11

| Field | Bitwidth |
|---|---|
| Wide-band CQI | 4 |

Table 12 is an example of a CQI and PMI feedback UCI field for wideband reporting. Table 12 is a case of closed-loop spatial multiplexing PDSCH transmission.

TABLE 12

| | Bitwidths | | | |
|---|---|---|---|---|
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Precoding matrix indication | 2 | 1 | 4 | 4 |

Table 13 is an example of a size of an RI feedback UCI field for wideband reporting.

TABLE 13

| | Bitwidths | | |
|---|---|---|---|
| | | 4 antenna ports | |
| Field | 2 antenna ports | Max 2 layers | Max 4 layers |
| Rank indication | 1 | 1 | 2 |

In this case, $a_0$ and $a_{A-1}$ respectively denote a most significant bit (MSB) and a least significant bit (LSB). In the extended CP structure, A can be up to 11 except for a case where CQI and ACK/NACK are simultaneously transmitted. QPSK modulation can be applied to control information encoded into 20 bits by using an RM code. In addition, the encoded control information can be scrambled before QPSK modulation.

FIG. 8 shows a PUCCH format 2/2a/2b. FIG. 8(a) shows a normal CP structure, and FIG. 8(b) shows an extended CP structure. In FIG. 8(a), reference signals are transmitted in $2^{nd}$ and $6^{th}$ SC-FDMA symbols. In FIG. 8(b), reference signals are transmitted in a $4^{th}$ SC-FDMA symbol.

In a normal CP structure, one subframe includes 10 QPSK data symbols except for an SC-FDMA symbol for reference signal transmission. That is, each QPSK symbol can be spread by a cyclic shift in an SC-FDMA symbol level by using a 20-bit encoded CQI.

In addition, SC-FDMA symbol level cyclic shift hopping can be applied for ICI randomization. A reference signal can be multiplexed according to code division multiplexing (CDM) by using a cyclic shift. For example, if the number of available cyclic shift values is 12, 12 UEs can be multiplexed in one PRB. That is, each of a plurality of UEs in a PUCCH format 1/1a/1b and a PUCCH format 2/2a/2b can be multiplexed by using a cyclic shift/orthogonal covering/resource block and a cyclic shift/resource block.

A PRB used for PUCCH transmission in a slot $n_s$ can be determined by Equation 2.

$$n_{PRB} = \begin{cases} \left\lfloor \dfrac{m}{2} \right\rfloor & \text{if } (m+n_s\text{mod}2)\text{mod}2 = 0 \\ N_{RB}^{UL} - 1 - \left\lfloor \dfrac{m}{2} \right\rfloor & \text{if } (m+n_s\text{mod}2)\text{mod}2 = 1 \end{cases} \quad \langle\text{Equation 2}\rangle$$

In Equation 2, $n_{PRB}$ denotes a PRB index. $N_{RB}^{UL}$ is an uplink bandwidth configuration expressed with a multiple of $N_{SC}^{RB}$. $N_{SC}^{RB}$ is a size of a resource block in a frequency domain and is expressed with the number of subcarriers. When the PRB is mapped to a PRB, the PUCCH can be mapped in the order of an outer PRB and an inner PRB. In addition, it can be mapped in the order of a PUCCH format 2/2a/2b, an ACK/NACK combination format, and a PUCCH format 1/1a/1b.

In the PUCCH format 1/1a/1b, m can be determined by Equation 3.

$\langle\text{Equation 3}\rangle$ $$m = \begin{cases} N_{RB}^{(2)} & \text{if } n_{PUCCH}^{(1)} < c \cdot N_{cs}^{(1)} / \Delta_{shift}^{PUCCH} \\ \left\lfloor \dfrac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

In Equation 3, $N_{RB}^{(2)}$ denotes a bandwidth expressed with a resource block that can be used in the PUCCH format 2/2a/2b in each slot. $n_{PUCCH}^{(1)}$ denotes an index of a resource used for PUCCH format 1/1a/1b transmission. $N_{cs}^{(1)}$ denotes the number of cyclic shift values used for the PUCCH format 1/1a/1b in a resource block used in a mixed structure of the PUCCH format 1/1a/1b and format 2/2a/2b.

In the PUCCH format 2/2a/2b, m can be determined by Equation 4.

$$m = \lfloor n_{PUCCH}^{(2)} / N_{sc}^{RB} \rfloor \quad \langle\text{Equation 4}\rangle$$

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 9:
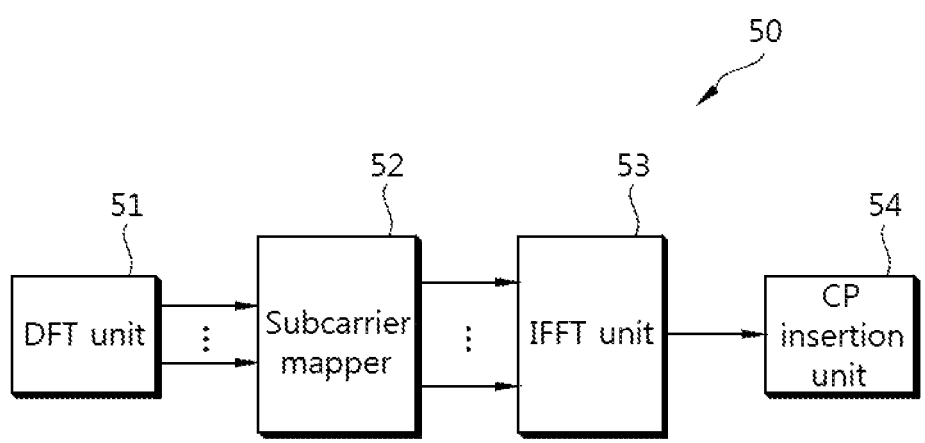
FIG. 9 shows an example of the structure of a transmitter in an SC-FDMA system.

FIG. 9 shows an example of the structure of a transmitter in an SC-FDMA system.

Referring to FIG. 9, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 10:
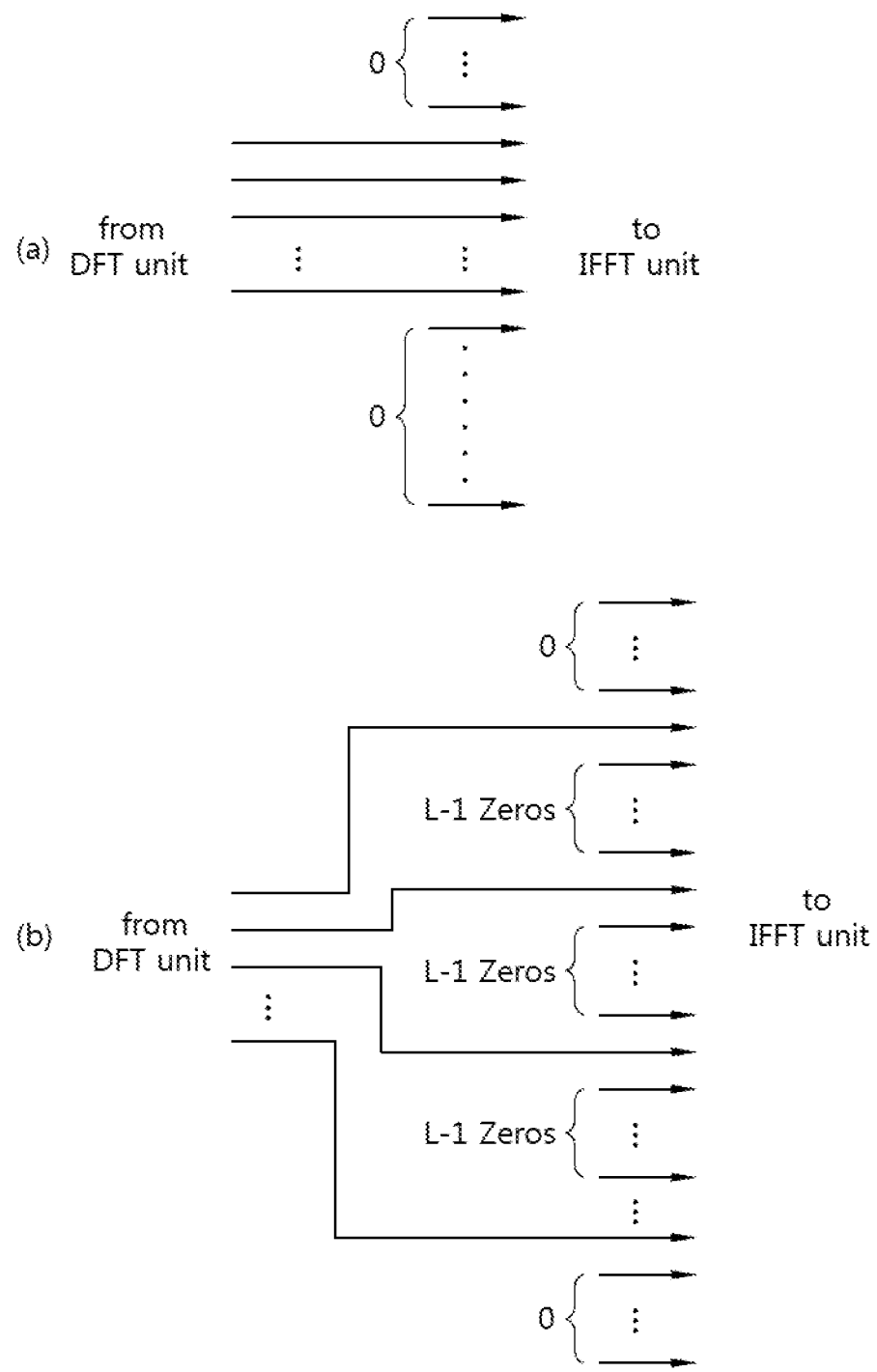
FIG. 10 shows an example of a scheme in which the sub-carrier mapper maps the complex-valued symbols to the respective subcarriers of the frequency domain.

FIG. 10 shows an example of a scheme in which the subcarrier mapper maps the complex-valued symbols to the respective subcarriers of the frequency domain.

Referring to FIG. 10(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 10(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 10(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 11:
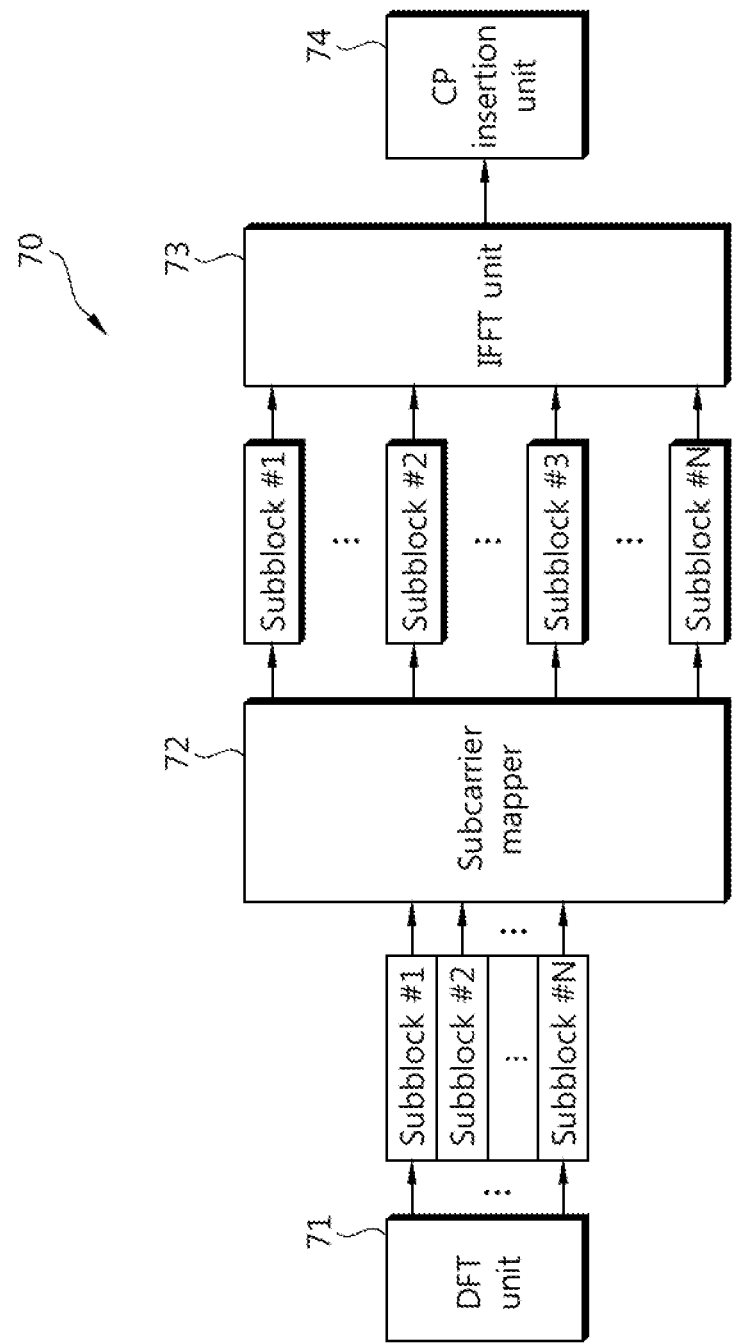
FIG. 11 shows an example of a transmitter using the clustered DFT-s OFDM transmission scheme.

FIG. 11 shows an example of a transmitter using the clustered DFT-s OFDM transmission scheme.

Referring to FIG. 11, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 11 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 12:
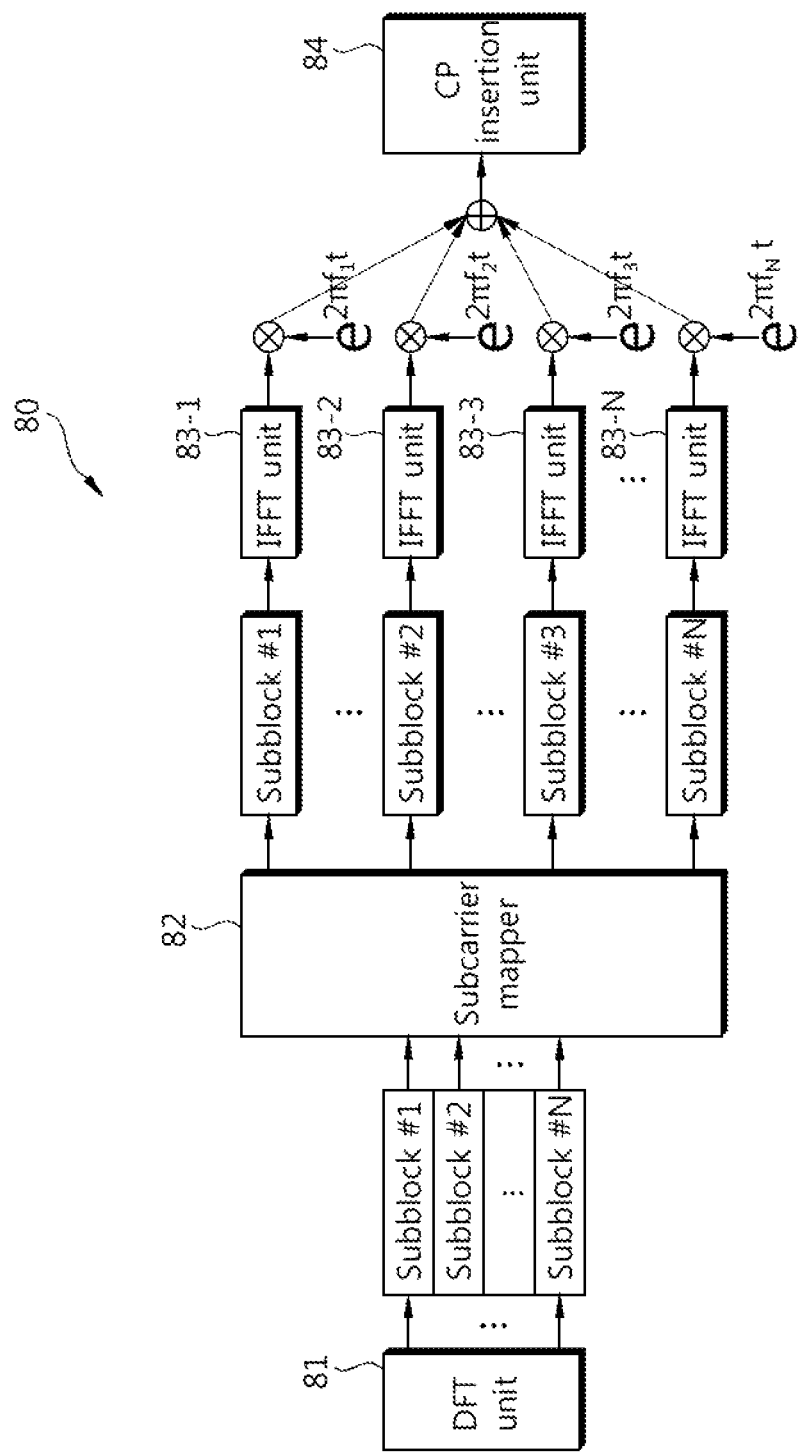
FIG. 12 shows another example of a transmitter using the clustered DFT-s OFDM transmission scheme.

FIG. 12 shows another example of a transmitter using the clustered DFT-s OFDM transmission scheme.

Referring to FIG. 12, the transmitter 80 includes a DFT unit 81, a subcarrier mapper 82, a plurality of IFFT units 83-1, 83-2, ..., 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-$n$ outputs an nth baseband signal (n=1, 2, ..., N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 12 may be used in a discontinuous carrier allocation situation where carriers allocated to the transmitter are not contiguous to each other.

Figure 13:
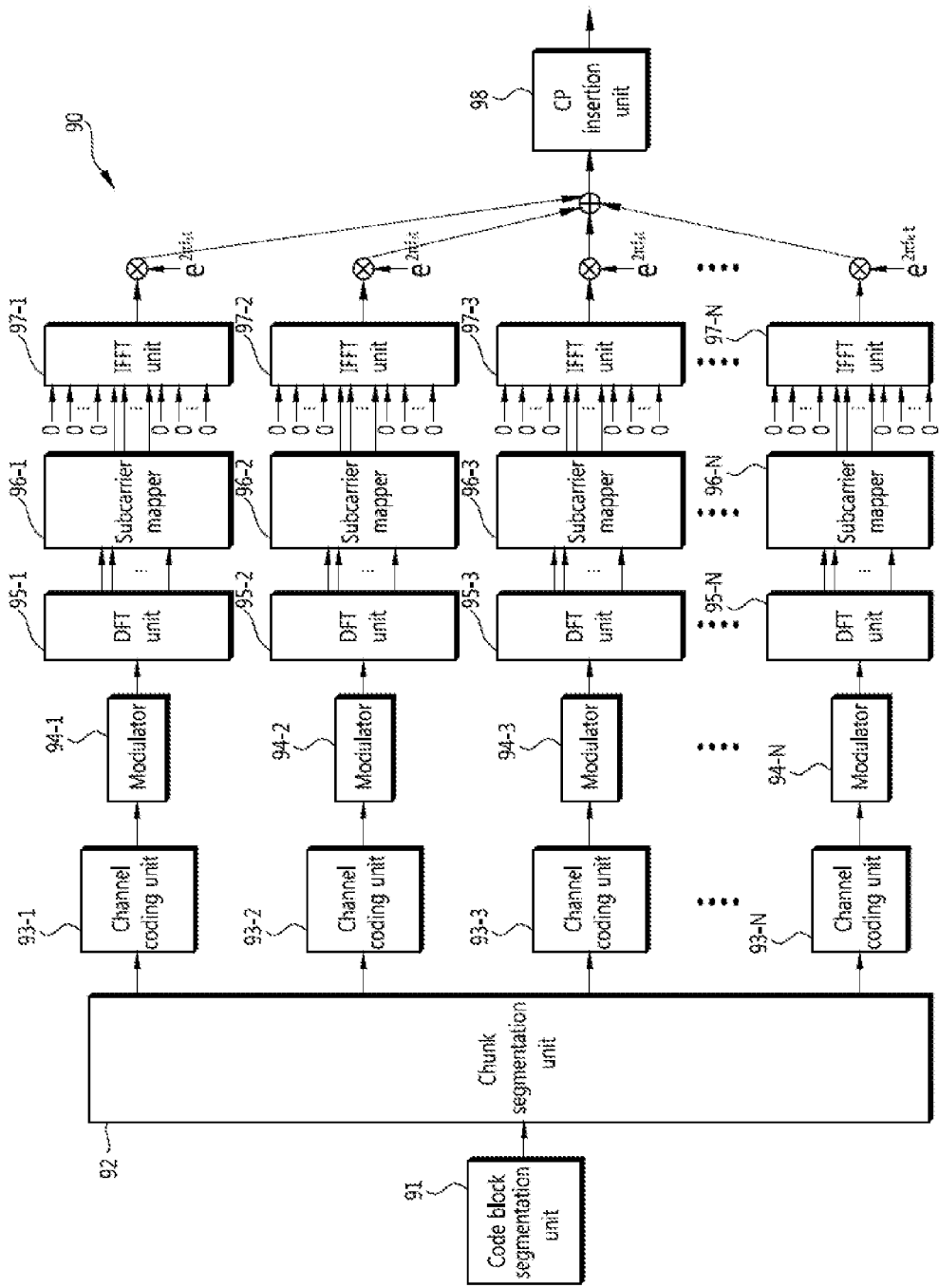
FIG. 13 is another example of a transmitter using the clustered DFT-s OFDM transmission scheme.

FIG. 13 is another example of a transmitter using the clustered DFT-s OFDM transmission scheme.

FIG. 13 is a chunk-specific DFT-s OFDM system performing DFT precoding on a chunk basis. This may be called Nx SC-FDMA. Referring to FIG. 13, the transmitter 90 includes a code block division unit 91, a chunk division unit 92, a plurality of channel coding units 93-1, ..., 93-N, a plurality of modulators 94-1, ..., 94-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift a according to Equation 5.

$$r_{u,v}^{(\alpha)}(n)=e^{j\alpha n}b_{u,v}(n), 0 \le n < M_{sc}^{RS} \qquad \text{<Equation 5>}$$

In Equation 5, $M_{sc}^{RS}$ ($1 \le m \le N_{RB}^{max,UL}$) is the length of the reference signal sequence and $M_{sc}^{RS}=m*N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value α from one basic sequence.

A basic sequence $b_{u,v}(n)$ is divided into a plurality of groups. Here, u {0, 1, ..., 29} indicates a group index, and v indicates a basic sequence index within the group. The basic sequence depends on the length $M_{sc}^{RS}$ of the basic sequence. Each group includes a basic sequence (v=0) having a length of $M_{sc}^{RS}$ for m ($1 \le m \le 5$) and includes 2 basic sequences (v=0, 1) having a length of $M_{sc}^{RS}$ for m ($6 \le m \le n_{RB}^{max,UL}$). The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 6.

$$b_{u,v}(n)=x_q(n \bmod N_{ZC}^{RS}), 0 \le n \le M_{sc}^{RS} \qquad \text{<Equation 6>}$$

In Equation 6, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 7.

$$x_q(m) = e^{-j\frac{\pi q m(m+1)}{N_{ZC}^{RS}}}, 0 \leq m \leq N_{ZC}^{RS} - 1 \qquad \langle \text{Equation 7} \rangle$$

q may be given by Equation 8.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \qquad \text{<Equation 8>}$$

If the length of the reference signal sequence is $3N_{sc}^{RB}$ or less, the basic sequence may be defined by Equation 9.

$$b_{u,v}(n) = e^{j\phi(n)\pi/4}, 0 \leq n \leq M_{sc}^{RS} - 1 \qquad \text{<Equation 9>}$$

Table 14 is an example where φ(n) is defined when $M_{sc}^{RS} = N_{sc}^{RB}$.

TABLE 14

| | φ(0), ... , φ(11) | | | | | | | | | | |
|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |

TABLE 14-continued

| | φ(0), ... , φ(11) | | | | | | | | | | |
|---|---|---|---|---|---|---|---|---|---|---|---|
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Table 15 is an example where φ(n) is defined when $M_{sc}^{RS} = 2 \cdot N_{sc}^{RB}$.

TABLE 15

| | φ(0), ... , φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | -1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of a reference signal may be applied as follows.

The sequence group index u of a slot index $n_s$ may be defined based on a group hopping pattern $f_{gh}(n_s)$ and a sequence shift pattern $f_{ss}$ according to Equation 10.

$$u = (f_{gh}(n_s) + f_{ss}) \bmod 30 \qquad \text{<Equation 10>}$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 11.

$$f_{gh}(n_s) = \qquad \text{<Equation 11>}$$
$$\begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

In Equation 12, c(i) is a pseudo random sequence that is a PN sequence and may be defined by a Gold sequence of a length −31. Equation 12 shows an example of a gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \qquad \text{<Equation 12>}$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH} = N_{ID}^{cell} \bmod 30$. The sequence shift pattern of the PUSCH may be $f_{ss}^{PUSCH} = (f_{ss}^{PUCCH} + \Delta_{ss}) \bmod 30$ and $\Delta_{ss}$ {0, 1, ..., 29} may be configured by a higher layer.

Sequence hopping may be applied to only a reference signal sequence having a length longer than $6N_{sc}^{RB}$. Here, a basic sequence index v within a basic sequence group of a slot index $n_s$ may be defined by Equation 13.

$$v = \begin{cases} c(n_s) & \text{if group hopping is disabled and} \\ & \text{sequence hopping is enabled} \\ 0 & \text{otherwise} \end{cases} \qquad \text{<Equation 13>}$$

c(i) may be represented by an example of Equation 12. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 14.

$$r^{PUSCH}(m \cdot M_{sc}^{RS} + n) = r_{u,v}^{(\alpha)}(n) \qquad \text{<Equation 14>}$$

In Equation 14, m=0, 1, ... and n=0, ..., $M_{sc}^{RS}$−1. $M_{sc}^{RS} = M_{sc}^{PUSCH}$.

$\alpha = 2\pi n_{cs}/12$, that is, a cyclic shift value is given within a slot, and $n_{cs}$ may be defined by Equation 15.

$$n_{cs} = (n_{DMRS}^{(1)} + n_{DMRS}^{(2)} + n_{PRS}(n_s)) \bmod 12 \qquad \text{<Equation 15>}$$

In Equation 15, $n_{DMRS}^{(1)}$ is indicated by a parameter transmitted by a higher layer, and Table 16 shows an example of a corresponding relationship between the parameter and $n_{DMRS}^{(1)}$.

TABLE 16

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 15, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 17 shows an example of a corresponding relationship between the cyclic shift field and $n_{DMRS}^{(2)}$.

TABLE 17

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Table 18 is another example of a corresponding relationship between the cyclic shift field and $n_{DMRS}^{(2)}$.

TABLE 18

| Cyclic shift field in DCI format 0 | $n_{DMRS}^{(2)}$ |
|---|---|
| 000 | 0 |
| 001 | 2 |
| 010 | 3 |

TABLE 18-continued

| Cyclic shift field in DCI format 0 | $n_{DMRS}^{(2)}$ |
|---|---|
| 011 | 4 |
| 100 | 6 |
| 101 | 8 |
| 110 | 9 |
| 111 | 10 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

$n_{PRS}(n_s)$ may be defined by Equation 16.

$$n_{PRS}(n_s) = \Sigma_{i=0}^{7} c(8N_{symb}^{UL} \cdot n_s + i) \cdot 2^i \qquad \text{<Equation 16>}$$

c(i) may be represented by the example of Equation 12 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence $r^{PUSCH}$ is multiplied by an amplitude scaling factor $\beta_{PUSCH}$ and mapped to a physical transmission block, used in relevant PUSCH transmission, from $r^{PUSCH}(0)$ in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

Figure 14:
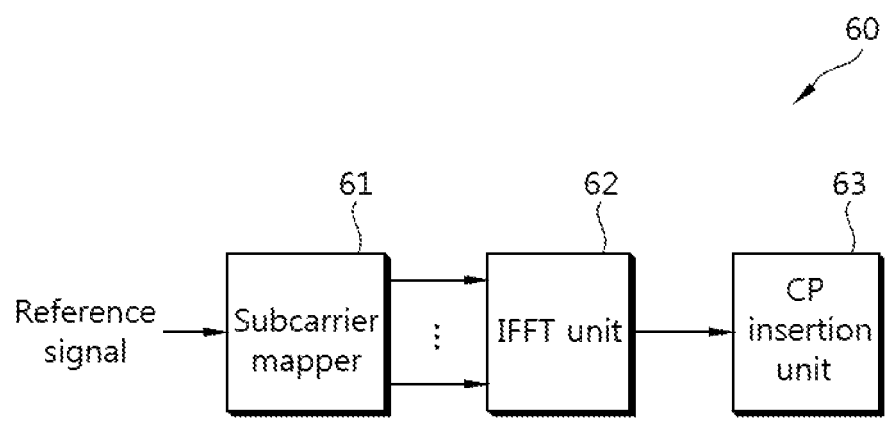
FIG. 14 shows an example of the structure of a reference signal transmitter for demodulation.

FIG. 14 shows an example of the structure of a reference signal transmitter for demodulation.

Referring to FIG. 14 the reference signal transmitter 60 includes a subcarrier mapper 61, an IFFT unit 62, and a CP insertion unit 63. Unlike the transmitter 50 of FIG. 9, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 10(a).

FIG. 15 shows examples of a subframe through which a reference signal is transmitted.

The structure of the subframe in FIG. 15(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 15(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted.

Hereinafter, an improved PUCCH format will be described. Multi-sequence modulation (MSM) or resource selection can be used as the improved PUCCH format.

First, the MSM will be described. To increase a size of a payload of an LTE rel-8 PUCCH, a method of obtaining channel coding by using a plurality of resources can be used. For example, two orthogonal resources can be used to use the plurality of resources. 20-bit encoded information can be QPSK modulated for each orthogonal resource, and then can be transmitted through 10 corresponding SC-FDMA symbols. Therefore, in case of using the two orthogonal resources, 40-bit encoded information can be transmitted using QPSK modulation. The encoded information can be generated by jointly coding all information bits.

Figure 16:
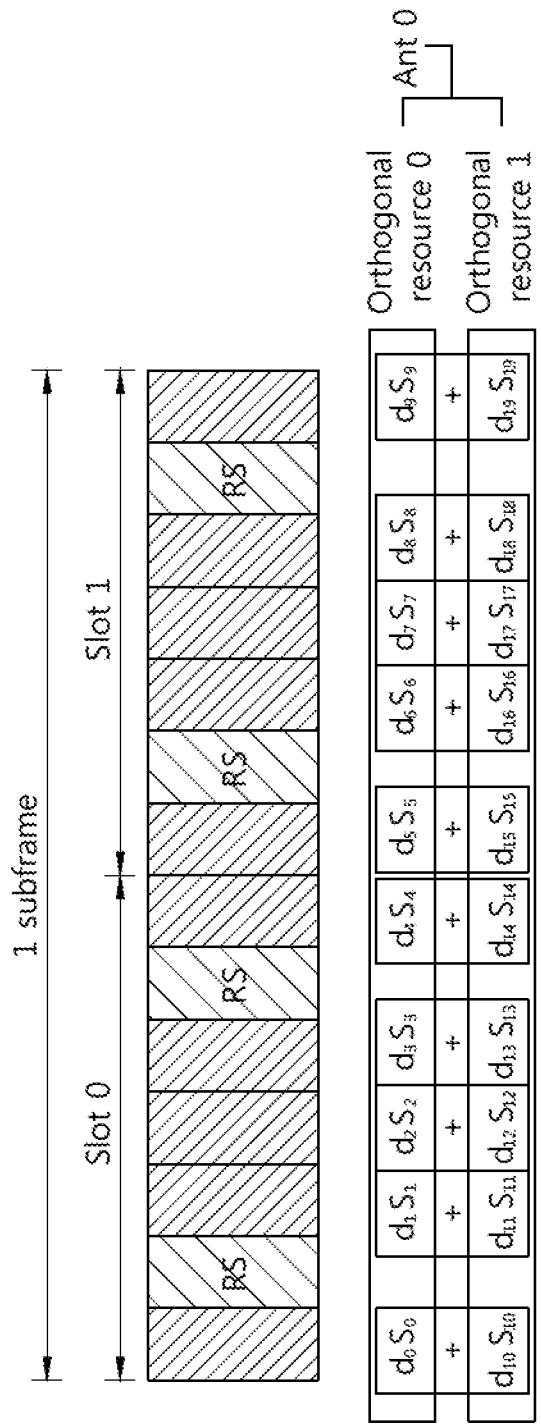
FIG. 16 shows an example of a case where MSM is applied to a single antenna.

FIG. 16 shows an example of a case where MSM is applied to a single antenna.

In FIG. 16, $d_0, d_1, \ldots, d_{19}$ denote QPSK modulation symbols, and Sn denotes a modulation sequence consisting of cyclic shift of a basic sequence. The QPSK modulation symbol is multiplied by the modulation sequence on a bit basis. That is, a symbol $d_0$ and a sequence $s_0$, a symbol $d_1$ and a sequence $s_1, \ldots$, a symbol $d_{19}$ and a sequence $s_{19}$ are respectively multiplied. $d_0 S_0, d_1 S_1, \ldots, d_9 S_9$ based on an orthogonal sequence #0 are mapped to 10 SC-FDMA symbols. Likewise, $d_{10}S_{10}, d_{11}S_{11}, \ldots, d_{19}S_{19}$ based on an orthogonal resource #1 are also mapped to 10 SC-FDMA symbols. Information mapped to each SC-FDMA symbol is added to each other and is then transmitted through an antenna. Sn can be hopped from one symbol to another symbol.

Precoding can be applied when MSM is applied. Table 19 is an example of a rule of mapping modulation symbols $d_0, d_1, \ldots, d_{19}$ generated after a precoding process is performed.

TABLE 19

| | Symbol s1 | | Symbol s2 | |
|---|---|---|---|---|
| b(0), b(1), b(2), b(3) | I | Q | I | Q |
| 0000 | $-1/\sqrt{2}$ | $-1/\sqrt{2}$ | 0 | 0 |
| 0001 | $-1/\sqrt{2}$ | 0 | 0 | $-1/\sqrt{2}$ |
| 0010 | 0 | $-1/\sqrt{2}$ | $-1/\sqrt{2}$ | 0 |
| 0011 | 0 | 0 | $-1/\sqrt{2}$ | $-1/\sqrt{2}$ |
| 0100 | $-1/\sqrt{2}$ | 0 | 0 | $1/\sqrt{2}$ |
| 0101 | $-1/\sqrt{2}$ | $1/\sqrt{2}$ | 0 | 0 |
| 0110 | 0 | 0 | $-1/\sqrt{2}$ | $1/\sqrt{2}$ |
| 0111 | 0 | $1/\sqrt{2}$ | $-1/\sqrt{2}$ | 0 |
| 1000 | 0 | $-1/\sqrt{2}$ | $1/\sqrt{2}$ | 0 |
| 1001 | 0 | 0 | $1/\sqrt{2}$ | $-1/\sqrt{2}$ |
| 1010 | $1/\sqrt{2}$ | $-1/\sqrt{2}$ | 0 | 0 |
| 1011 | $1/\sqrt{2}$ | 0 | 0 | $-1/\sqrt{2}$ |
| 1100 | 0 | 0 | $1/\sqrt{2}$ | $1/\sqrt{2}$ |
| 1101 | 0 | $1/\sqrt{2}$ | $1/\sqrt{2}$ | 0 |
| 1110 | $1/\sqrt{2}$ | 0 | 0 | $1/\sqrt{2}$ |
| 1111 | $1/\sqrt{2}$ | $1/\sqrt{2}$ | 0 | 0 |

Resource selection can be applied in a specific form of MSM. The resource selection implies an operation in which radio resources are identified and are then respectively allocated to some of encoded information bits. The resource selection can be applied to maintain a low peak-to-average power ratio (PAPR) or cubic metric (CM).

Figure 17:
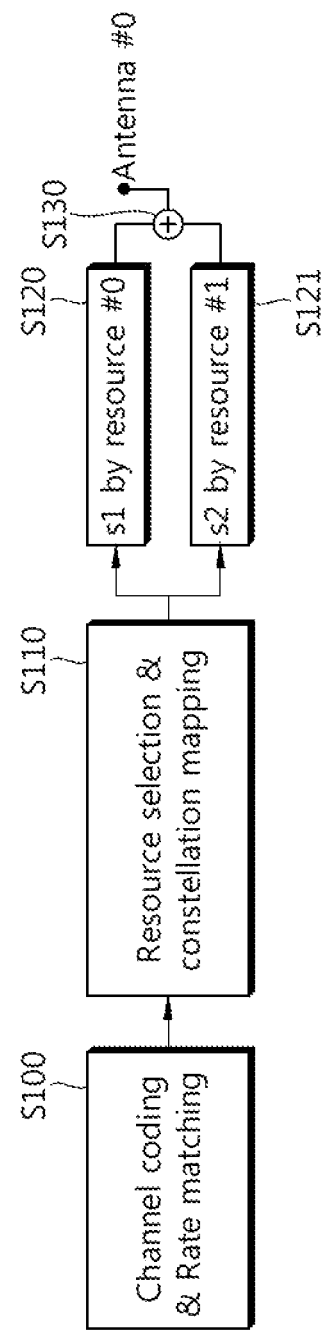
FIG. 17 shows a transmission structure of resource selection.

FIG. 17 shows a transmission structure of resource selection. In step S100, channel coding and rate matching are performed. In step S110, a radio resource is selectively allocated to an encoded information bit, and thus constellation mapping is performed. In step S120, a 1$^{st}$ symbol s1 based on a radio resource #0 is generated. In step S121, a 2$^{nd}$ symbol s2 based on a radio resource #1 is generated. In step S130, the 1st symbol and the 2nd symbol are combined and transmitted through an antenna.

Table 20 is an example of a table used for applying resource selection with respect to 30-bit encoded information after joint coding. Table 20 is determined by considering a Euclidian distance and a Hamming distance.

TABLE 20

| b(0), b(1), b(2) | Symbol s1 | | Symbol s2 | |
|---|---|---|---|---|
| | I | Q | I | Q |
| 000 | $-1/\sqrt{2}$ | $-1/\sqrt{2}$ | 0 | 0 |
| 001 | 0 | 0 | $-1/\sqrt{2}$ | $-1/\sqrt{2}$ |
| 010 | $-1/\sqrt{2}$ | $1/\sqrt{2}$ | 0 | 0 |
| 011 | 0 | 0 | $-1/\sqrt{2}$ | $1/\sqrt{2}$ |
| 100 | 0 | 0 | $1/\sqrt{2}$ | $-1/\sqrt{2}$ |
| 101 | $1/\sqrt{2}$ | $-1/\sqrt{2}$ | 0 | 0 |
| 110 | 0 | 0 | $1/\sqrt{2}$ | $1/\sqrt{2}$ |
| 111 | $1/\sqrt{2}$ | $1/\sqrt{2}$ | 0 | 0 |

Table 21 is an example of a table used to apply resource selection on the basis of 8PSK with respect to 40-bit encoded information.

TABLE 21

| b(0), b(1), b(2), b(3) | Symbol s1 | | Symbol s2 | |
|---|---|---|---|---|
| | I | Q | I | Q |
| 0000 | $-1/\sqrt{2}$ | $-1/\sqrt{2}$ | 0 | 0 |
| 0001 | $-1$ | 0 | 0 | 0 |
| 0010 | 0 | 0 | $-1$ | 0 |
| 0011 | 0 | 0 | $-1/\sqrt{2}$ | $-1/\sqrt{2}$ |
| 0100 | 0 | 0 | 0 | 1 |
| 0101 | $-1/\sqrt{2}$ | $1/\sqrt{2}$ | 0 | 0 |
| 0110 | 0 | 0 | $-1/\sqrt{2}$ | $1/\sqrt{2}$ |
| 0111 | 0 | 1 | 0 | 0 |
| 1000 | 0 | $-1$ | 0 | 0 |
| 1001 | 0 | 0 | $1/\sqrt{2}$ | $-1/\sqrt{2}$ |
| 1010 | $1/\sqrt{2}$ | $-1/\sqrt{2}$ | 0 | 0 |
| 1011 | 0 | 0 | 0 | $-1$ |
| 1100 | 0 | 0 | $1/\sqrt{2}$ | $1/\sqrt{2}$ |
| 1101 | 0 | 0 | 1 | 0 |
| 1110 | 1 | 0 | 0 | 0 |
| 1111 | $1/\sqrt{2}$ | $1/\sqrt{2}$ | 0 | 0 |

Figure 18:
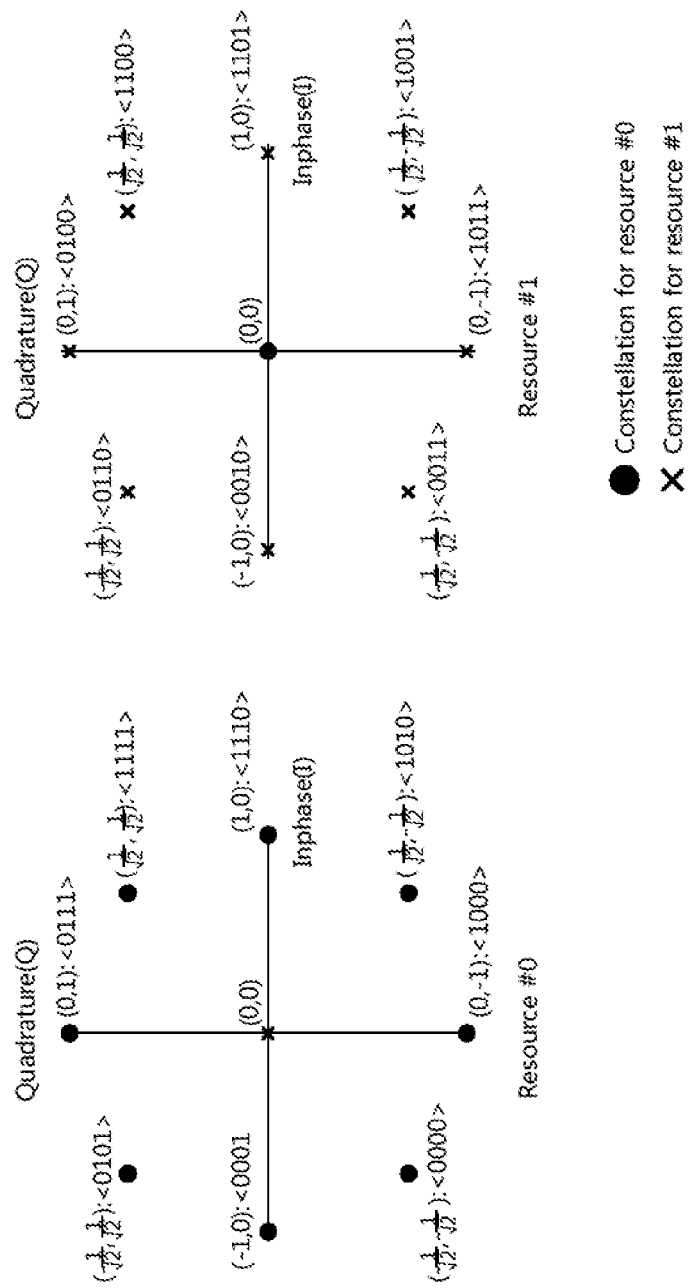
FIG. 18 shows a constellation in which a modulation symbol of Table 21 is mapped.

FIG. 18 shows a constellation in which a modulation symbol of Table 21 is mapped. Each of a symbol s1 based on a radio resource #0 and a symbol s2 based on a radio resource #1 is mapped to the constellation on the basis of a selected resource.

Hereinafter, contention-based uplink transmission will be described.

A control plane (C-plane) can be classified into an idle mode and a connected mode. The idle mode implies a state in which a UE and a BS are not connected to each other. That is, the idle mode is a state in which the RRC connection is not established. The UE can monitor paging information and system information which are broadcast through a broadcast channel (BCH) while performing a low power consuming operation with a discontinuous reception (DRX) period. The connected mode implies that the UE and the BS are connected to each other. That is, the connected mode is a state in which the RRC connection has already been established. Since the connection is established between the BS and the UE, data can be transmitted or received bi-directionally.

In addition, a dormant state and an active state can be defined to minimize power consumption of the UE in the connected mode. If there is no data transmission/reception during a time greater than or equal to a specific time in the active state in which the data is actually transmitted or received, the UE transitions from the active state to the dormant state to minimize power consumption. In the dormant state, the UE monitors a control channel according to a DRX/discontinuous transmission (DTX) period. The UE in the dormant state transitions to an active state in an on-duration which is a time for receiving a PDCCH in a DRX period. The UE in the active state monitors the PDCCH, and if the PDCCH is successfully decoded, maintains the active state, and otherwise if decoding of the PDCCH fails, transitions again to the dormant state. The dormant state and the active state of the UE are managed by media access control (MAC)/radio link control (RLC).

Figure 19:
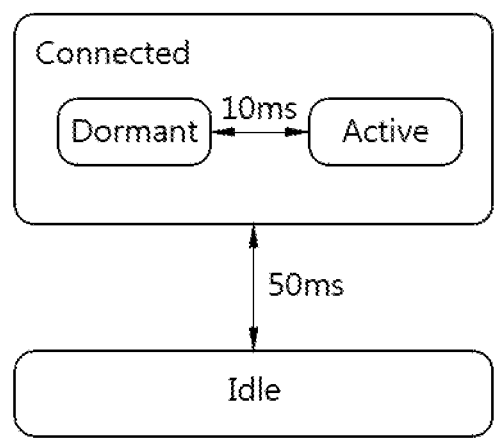
FIG. 19 is a requirement of a latency in a C-plane in 3GPP LTE-A.

FIG. 19 is a requirement of a latency in a C-plane in 3 GPP LTE-A.

Referring to FIG. 19, 3GPP LTE-A requires that a transition time from an idle mode to a connected mode is less than or equal to 50 ms. In this case, the transition time includes a setup time of a user plane (U-plane). In addition, it is required that a transition time from a dormant state to an active state in a connected mode is less than or equal to 10 ms.

Table 22 is an example of a time for transitioning from a dormant state to an active state and started by an uplink.

TABLE 22

| Component | Description | Time [ms] |
|---|---|---|
| 1 | Average delay to next SR opportunity (5 ms PUCCH cycle) | 2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 11.5 |

Referring to Table 22, a total transition time can include an average time (i.e., a component 1) of waiting for a subframe capable of transmitting an SR from a time when a UE in a dormant state intents to perform uplink transmission to an uplink data transmission time (i.e., a component 6). In LTE rel-8, a UE which intends to transition from the dormant state to an active state first transmits the SR to a BS by using a PUCCH format 1. The UE receives a UL grant from the BS, and thereafter transmits a signal indicating a buffer status to the BS through a PUSCH. Table 22 shows that a synchronized UE can transition from the dormant state to the active state within 11.5 ms. This is a transition time when a period for transmitting the SR is set to a minimum value, that is, 5 ms. That is, even if the period of SR transmission is minimized, a transition time from the dormant state to the active state cannot satisfy a requirement of being less than or equal to 10 ms as required by LTE-A. To solve this problem, contention-based uplink transmission is required.

In order to decrease a delay time in LTE-A, the contention-based uplink transmission can be applied. The contention-based uplink transmission allows a plurality of UEs to first send uplink data instead of first sending an SR. Accordingly, an access time is decreased regarding a UE of which synchronization has already been complete in a connected mode. The contention-based uplink transmission can be implemented by arbitrarily transmitting by the UE a buffer status signal or the like for indicating a buffer status. A signal used in the contention-based uplink transmission can be predetermined or can be triggered by other factors. Alternatively, the UE can transmit not only the buffer status signal but also actual data. When the BS successfully detects the contention-based uplink transmission, the BS can transmit a UL grant so that the UE can enter the active state.

Hereinafter, various transmission methods applicable to contention-based uplink transmission will be described according to an embodiment. In the following description, data which is randomly sent by a UE without SR transmission is called a contention-based uplink signal.

1) Contention Resolution

Upon detection of a contention-based uplink signal transmitted from a UE, a BS needs to transmit to the UE a signal indicating whether the contention-based uplink signal is detected. Since this corresponds to the same operation as transmission of an ACK/NACK signal of LTE rel-8, the BS can transmit to the UE a response for the contention-based uplink signal through a physical hybrid ARQ indicator channel (PHICH) defined for transmission of a downlink ACK/NACK signal in LTE rel-8. In the following description, the ACK/NACK signal implies a response signal for the contention-based uplink signal. If the contention-based uplink signal is successfully detected from the BS, the BS can transmit the ACK signal to the UE through the PHICH, and if it is not detected, can transmit the NACK signal to the UE. In this case, a PHICH resource for ACK/NACK transmission for the contention-based uplink signal can be allocated through broadcasting or through explicit signaling, for example, by using cell-specific or UE-specific RRC signaling or dynamic PDCCH signaling.

In LTE rel-8, a PHICH resource can be determined as follows. A plurality of PHICHs mapped to resource elements of the same set constitutes a PHICH group. Each PHICH in the PHICH group is identified by a different orthogonal sequence. In the FDD system, $N_{PHICH}^{group}$, i.e., the number of PHICH groups, is constant in all subframes, and can be determined by Equation 17 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{(Equation 17)}$$

In Equation 17, $N_g$ is transmitted in a higher layer through a physical broadcast channel (PBCH), where $N_g \in \{1/6, 1/2, 1, 2\}$. The PBCH carries essential system information when a UE communicates with a BS. The system information transmitted through the PBCH is called a master information block (MIB). In comparison, system information transmitted through a physical downlink control channel (PDCCH) is called a system information block (SIB). $N_{RB}^{DL}$ denotes a DL bandwidth configuration expressed with a multiple of $N_{sc}^{RB}$ which is an RB size in a frequency domain. A PHICH group index $n_{PHICH}^{group}$ is any one integer from 0 to $N_{PHICH}^{group}-1$.

A resource used in the PHICH can be determined based on a lowest physical resource block (PRB) index in resource allocation of the PUSCH and a cyclic shift value of a demodulation reference signal (DMRS) transmitted using a UL grant. A resource to which the PHICH is mapped (hereinafter, a PHICH resource) can be expressed by an index pair $(n_{PHICH}^{group}, n_{PHICH}^{seq})$. Herein, $n_{PHICH}^{group}$ denotes a PHICH group index, and $n_{PHICH}^{seq}$ denotes an orthogonal sequence index in the PHICH group. The index pair $(n_{PHICH}^{group}, n_{PHICH}^{seq})$ can be determined by Equation 18 below.

$$n_{PHICH}^{group} = (I_{PRB\_RA}^{lowest\_index} + n_{DMRS}) \bmod N_{PHICH}^{group} + I_{PHICH} N_{PHICH}^{group} \quad \text{(Equation 18)}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

$n_{DMRS}$ can be determined based on a "cyclic shift for DMRS" field in a DCI format 0 according to Table 23.

TABLE 23

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In addition, in a case where a PDCCH including the DCI format 0 is not transmitted in the same transport block, $n_{DMRS}$ may be 0 if a first PUSCH is semi-persistently scheduled in the same transport block or if the first PUSCH is scheduled in the same transport block by a random access response grant.

Returning to Equation 18, $N_{SF}^{PHICH}$ denotes a spreading factor (SF) used in PHICH modulation. $I_{PRB\_RA}^{lowest\_index}$ is a lowest PRB index among PRBs of a slot in which a PUSCH corresponding to a PHICH is transmitted. $I_{PHICH}$ has a value of 0 or 1.

Meanwhile, ACK/NACK for a contention-based uplink signal is difficult to use a PHICH resource determined by Equations 17 and 18. This is because the PHICH resource is determined by a lowest PRB index to which a PUSCH is assigned and a cyclic shift value of a DMRS, or because there is no rule for the PHICH resource determined based on the PUCCH. If two UEs share the same PRB and the same cyclic shift value, a PHICH collision phenomenon may occur when a response for the contention-based uplink signal is transmitted through the PHICH. Accordingly, a method for avoiding the PHICH collision phenomenon can be proposed.

Figure 20:
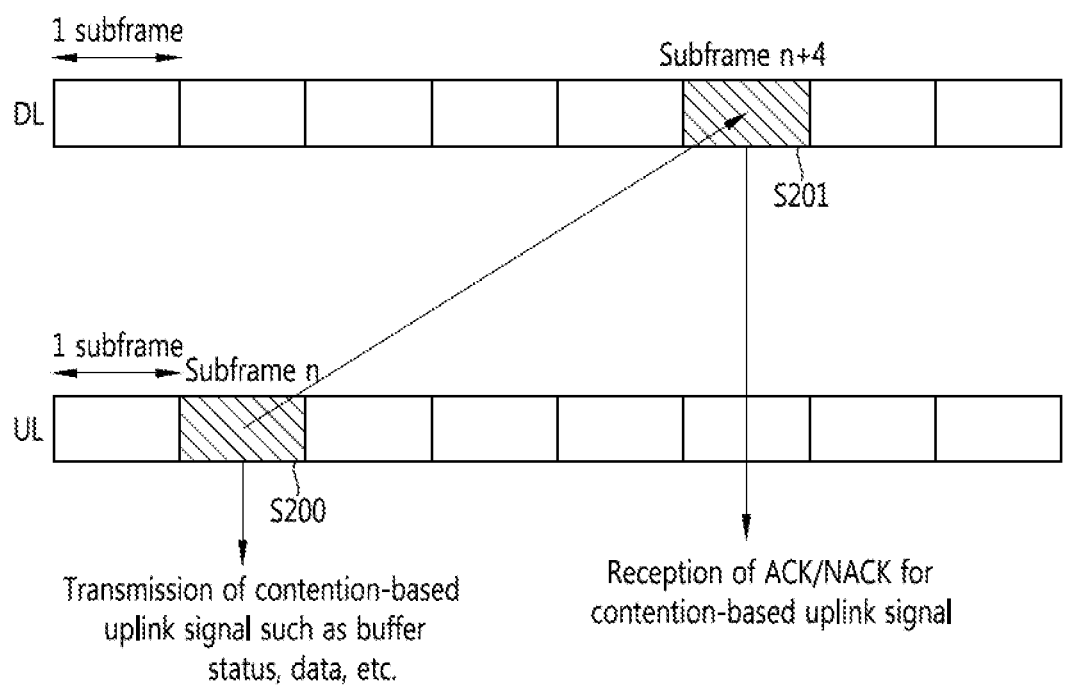
FIG. 20 shows an embodiment of the proposed method of performing contention-based uplink transmission.

FIG. 20 shows an embodiment of the proposed method of performing contention-based uplink transmission.

In step S200, a UE transmits a contention-based uplink signal to a BS. The contention-based uplink signal can be transmitted in a subframe n. Further, the contention-based uplink signal may be a buffer status, data, etc.

In step S201, the BS transmits to the UE an ACK/NACK signal indicating whether the contention-based uplink signal is successfully decoded. The ACK/NACK signal can be transmitted through a UL grant after the contention-based uplink signal is detected. The ACK/NACK signal can be transmitted in a subframe (n+4) as defined in LTE rel-8. In this case, a bit to which the ACK/NACK signal is assigned can be defined as a new field in the UL grant, or the ACK/NACK signal can be assigned by using the existing field. A UE-IE to which CRC is masked, that is, a cell-radio network temporary identifier (C-RNTI) or the like can be transmitted together with the ACK/NACK signal. Alternatively, UL grant transmission itself can implicitly indicate that the contention-based uplink signal is successfully decoded. In general, it is natural that the NACK signal is not transmitted. However, in order for the BS to detect the contention-based uplink signal, the NACK signal can be transmitted by using a DMRS or a known signal such as a PUCCH resources based on a threshold based detection algorithm.

2) Transmission of Contention-Based Uplink Signal Through PUCCH

A contention-based uplink signal can be transmitted by using either a PUCCH format 1/1a/1b or a format 2/2a/2b of LTE rel-8. A PUCCH format used for transmission of the contention-based uplink signal can be transmitted through a reserved resource among PRBs for PUCCH transmission, or can be transmitted through a specific PRB for PUSCH transmission. When considering a size of a payload between a buffer status signal and data, it may be more preferable to use the PUCCH format 2/2a/2b to transmit the contention-based uplink signal than to use the PUCCH format 1/1a/1b. When the PUCCH format 2/2a/2b is multiplexed in a PRB for the PUCCH format 1/1a/1b, it may be necessary to limit to use various types of cyclic shift values to maintain orthogonality.

It is assumed in the following description that the contention-based uplink signal is transmitted through the PUCCH format 2/2a/2b. In LTE rel-8, the PUCCH format 2/2a/2b can support up to 11 bits. However, the proposed invention can be applied when the contention-based uplink signal is transmitted through the PUCCH format 1/1a/1b. In addition, an improved PUCCH format such as the aforementioned MSM or resource selection can be applied to increase a size of a payload. When the improved PUCCH format is applied, information with 11 bits or more can be supported.

A radio resource consisting of a cyclic shift and a PRB can be shared by a plurality of UEs. A UE-specific or UE-group specific radio resource can be transmitted by using a method of RRC signaling. As the contention-based uplink signal is transmitted through the PUCCH format 2/2a/2b, an SC-FDMA symbol for transmitting a reference signal and an SC-FDMA symbol for transmitting data can be both used for SR detection. In addition, the SC-FDMA symbol for transmitting data can be used as an SC-FDMA symbol for transmitting a buffer status signal and data.

Figure 21:
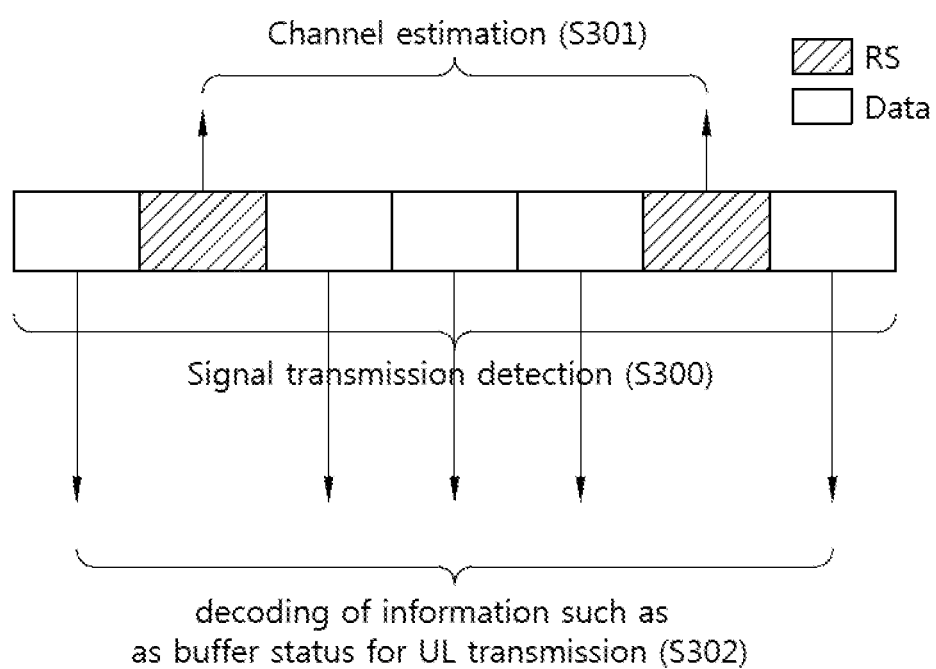
FIG. 21 shows another embodiment of the proposed method of performing contention-based uplink transmission.

FIG. 21 shows another embodiment of the proposed method of performing contention-based uplink transmission.

In step S300, a BS detects a contention-based uplink signal by using a UE-specific or UE group-specific reference signal and data. In this case, the contention-based uplink signal can be detected in LTE rel-8 in a similar form as OOK applied to SR transmission.

In step S301, the BS estimates a channel on the basis of a reference signal. Although it is assumed in the present embodiment that the reference signal is transmitted in $2^{nd}$ and $6^{th}$ SC-FDMA symbols, this is for exemplary purposes only.

In step S302, if the contention-based uplink signal is detected to a value greater than or equal to a specific threshold value, data is decoded in an SC-FDMA symbol on which the data is transmitted.

Meanwhile, there is a case where a specific radio resource is shared by a plurality of UEs. Accordingly, collision may occur among UEs due to contention-based uplink transmission of the UEs. In this case, since the BS can control whether the radio resource is used by a single UE or is shared by a plurality of UEs, a problem of collision occurring among the UEs in the contention-based uplink transmission can be avoided.

Figure 22:
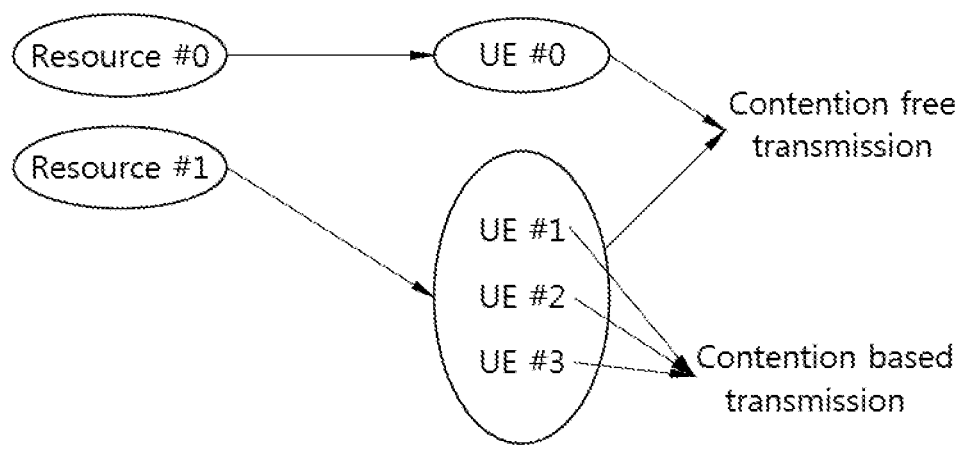
FIG. 22 is an example in which a radio resource is allocated to a plurality of UEs.

FIG. 22 is an example in which a radio resource is allocated to a plurality of UEs.

Referring to FIG. 22, a radio resource #0 is allocated only to a UE #0. Therefore, uplink transmission of the UE #0 can be prevented from collision with uplink transmission of other plurality of UEs. A radio resource #1 is allocated to a UE #1 to a UE #3. Accordingly, collision may occur among the UE #1 to the UE #3 in contention-based uplink transmission. That is, although uplink transmission can be performed by distinctively using orthogonal resources without collision between the UE #0 and the UEs #1 to #3, contention-based uplink transmission can be performed for the radio resource #1 among the UE #1 to the UE #3. In the embodiment of FIG. 22, different radio resources such as the radio resource #0 and the radio resource #1 can be identified by different sequences such as a PUCCH or can be identified by different PRBs such as a PUSCH.

As another method, the contention-based uplink signal can be transmitted through a resource randomly determined by the UE. That is, the UE can randomly select a resource for transmitting data. The UE can randomly select a resource for transmitting data on the basis of a function related to a timer included in the UE. For example, any function can be generated based on a value of the timer, and the resource for transmitting data can be randomly selected according to the generated function. Alternatively, the resource for transmitting data can be selected by the timer value itself.

For example, the UE can select a specific PRB for the usage of contention-based uplink transmission among PRBs for PUCCH transmission. Since a specific zone of the radio resource is used for the usage of contention-based uplink transmission, this can be called a zone-based PUCCH resource selection method. In this case, information for avoiding collision between contention-based uplink transmission and contention-free uplink transmission can be signaled through a higher layer. Alternatively, some of PUCCH resources such as a cyclic shift used for PUCCH transmission, orthogonal covering, PRB, etc., can be reserved and used for contention-based uplink transmission. Since some of the allocated PUCCH resources are reserved for the usage of uplink transmission, this can be called reserved PUCCH resource based resource selection method. That is, a PUCCH resource used for contention-based uplink transmission is a subset of a PUCCH resource used for contention-free uplink transmission.

In the proposed method of performing contention-based uplink transmission, in order to further randomize inter-user interference, a UE-specific scrambling code generated from a pseudo random sequence polynomial which uses a UE-ID or a C-RNTI as a seed can be applied to contention-based uplink transmission. In addition, in order to avoid collision among UEs from the perspective of the BS, CRC can be added before a channel coding operation. When the CRC is added, the CRC can be masked to the UE-ID or the C-RNTI. By the use of CRC masking, the BS can identify a plurality of contention-based uplink signals transmitted from a plurality of UEs without having to perform additional blind decoding. However, a simple comparison is necessary between CRC-masked values.

3) Transmission of Contention-Based Uplink Signal Through PUSCH

A contention-based uplink signal can also be transmitted through a PUSCH. In order to decrease inter-user interference, a UE-specific scrambling code can be applied. Further, a UE-ID or C-RNTI to which CRC is masked can be applied so as to be used when a BS determines existence of a contention-based uplink signal transmitted from a specific UE. Furthermore, a PUSCH can be hopped in a slot level.

A reference signal can be used to detect a contention-based uplink signal in the BS. For example, the BS can detect the reference signal according to a cyclic shift value of each reference signal. The BS can determine whether a corresponding reference signal is transmitted according to whether a specific cyclic shift value exists.

Meanwhile, when a plurality of UEs perform contention-based uplink transmission, reference signals transmitted by the respective UEs need to use different cyclic shift values if possible in order to improve detection performance. When each UE uses a different cyclic shift value, performance of orthogonal channel estimation from the plurality of UEs can be improved. Accordingly, the inter-user interference can be decreased.

Figure 23:
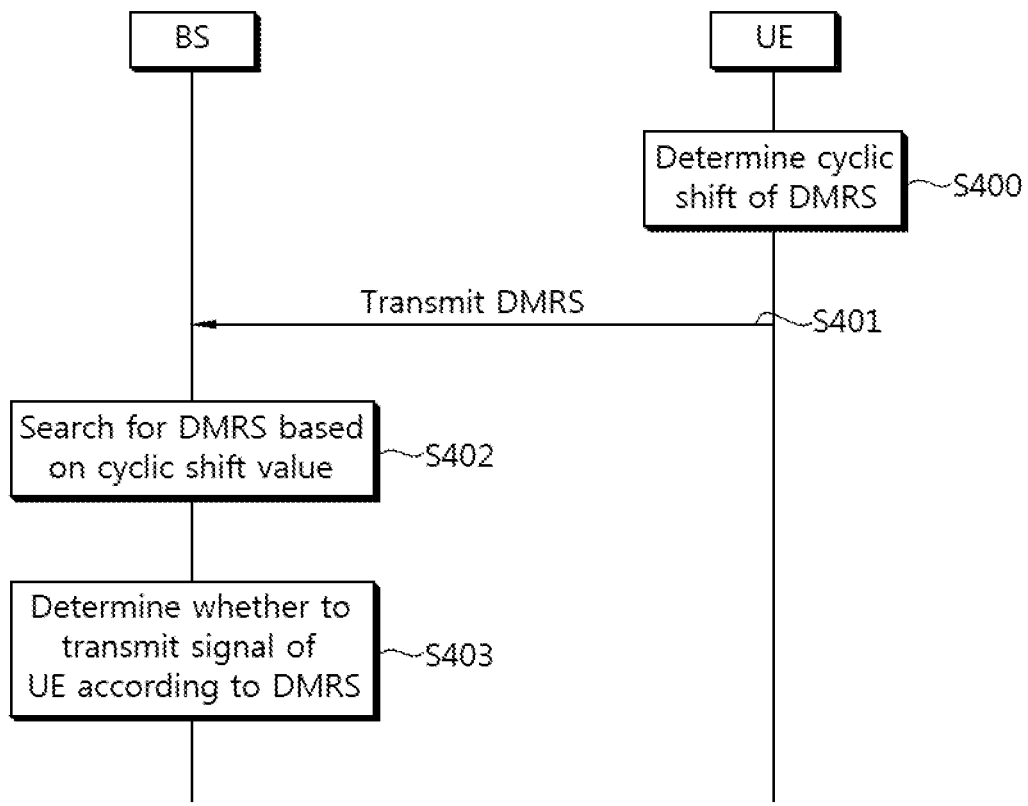
FIG. 23 is another embodiment of the proposed method of performing contention-based uplink transmission.

FIG. 23 is another embodiment of the proposed method of performing contention-based uplink transmission.

In step S400, a UE determines a cyclic shift value of a DMRS.

Various methods can be applied when a plurality of UEs determine the cyclic shift value of the DMRS.

For example, the UE can randomly select the cyclic shift value of the DMRS in contention-based uplink transmission. That is, the UE randomly selects the cyclic shift value when data transmission is necessary. The UE can randomly select the cyclic shift value and/or orthogonal code covering (OCC) on the basis of a function related to a timer included in the UE. For example, any function can be generated based on a value of the timer, and the cyclic shift value and/or the OCC can be randomly selected according to the generated function. Alternatively, the cyclic shift value and/or the OCC can be selected by the timer value itself. When a plurality of PRBs is allocated for contention-based uplink transmission, the plurality of PRB can be a target of random selection. Meanwhile, when the contention-based uplink transmission is based on Poisson distribution, a collision possibility of a plurality of UEs can be further decreased since the UE randomly selects the cyclic shift value.

Alternatively, the cyclic shift value of the DMRS can be predetermined by using a function of the UE-ID or C-RNTI. For example, it can be determined as $n_{cs} = n_{RNTI} \mod N_{CS}$. In this case, $n_{cs}$ is the cyclic shift value of the DMRS, $n_{RNTI}$ is the UE-ID or C-RNTI, and $N_{CS}$ is the maximum number of cyclic shift values. Herein, $N_{CS}$ may be 12.

The cyclic shift value of the DMRS can also be determined by RRC signaling. In this case, the cyclic shift value can be allocated such that collision does not occur among the plurality of UEs.

In step S401, the UE transmits a contention-based uplink signal including a DMRS based on the determined cyclic shift value to a BS.

In step S402, the BS receives the contention-based uplink signal, and searches for the DMRS according to a specific cyclic shift value.

In step S403, it is determined whether the contention-based uplink reference signal is transmitted in a specific UE on the basis of the DMRS. That is, the BS can determine whether the DMRS is transmitted according to a presence/absence of the specific cyclic shift value.

An opportunistic multi-user (MU) multiple-input multiple-output (MIMO) decoder can be used to perform contention-based uplink transmission through the PUSCH.

In this case, a precoding matrix of open-loop (OL) MIMO can be used for each UE, or a precoding matrix can be randomly selected by the UE for contention-based uplink transmission.

Figure 24:
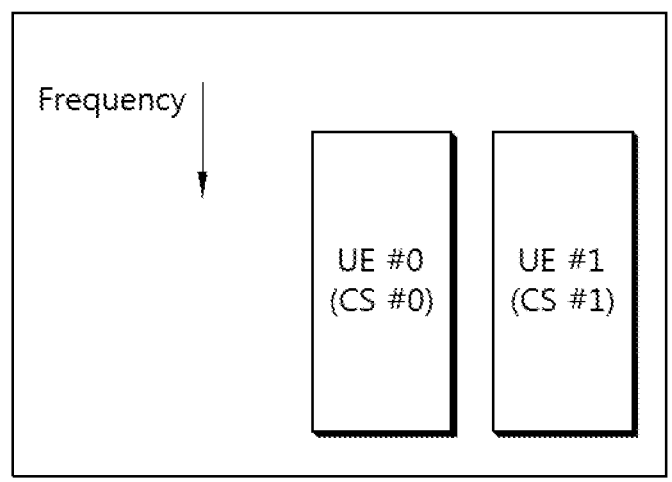
FIG. 24 shows an example of a case where an opportunistic MU-MIMO decoder is used.

FIG. 24 shows an example of a case where an opportunistic MU-MIMO decoder is used. Two UEs occupy the same PRB and different cyclic shift values. That is, a cyclic shift #0 is assigned to a UE #0, and a cyclic shift #1 is assigned to a UE #1.

Figure 25:
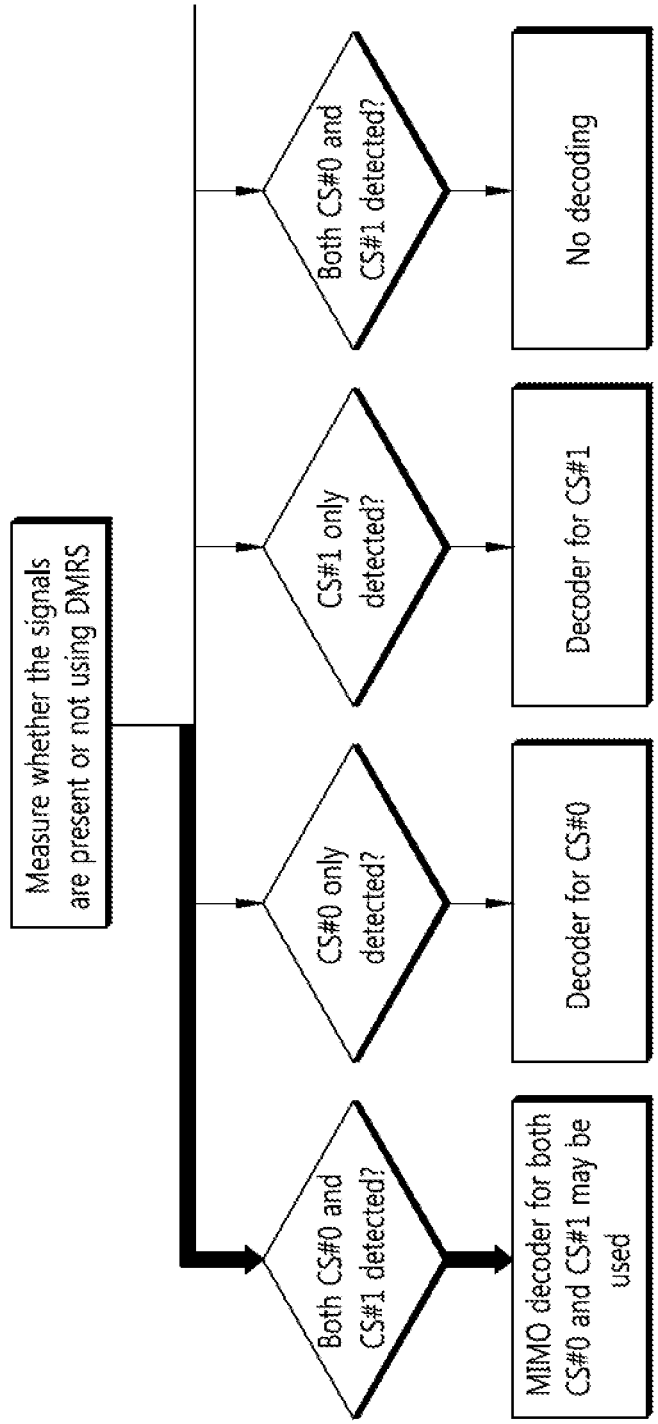
FIG. 25 is an embodiment of the proposed method of performing contention-based uplink transmission to which opportunistic MU-MIMO is applied.

FIG. 25 is an embodiment of the proposed method of performing contention-based uplink transmission to which opportunistic MU-MIMO is applied. A BS determines whether a contention-based uplink signal is transmitted by using a DMRS. In this case, if a cyclic shift #0 and a cyclic shift #1 are both detected, the opportunistic MU-MIMO decoder can be used (as indicated by a bold arrow in FIG. 25). The contention-based uplink signal transmitted from the two UEs can be successfully decoded by using the opportunistic MU-MIMO decoder. In addition, Walsh covering across a plurality of slots can be additionally applied to the DMRS in order to increase multiplexing capability.

Meanwhile, a resource granularity for opportunistic MU-MIMO of each UE can be limited by a bin. The bin may be one subcarrier or a group of a plurality of subcarriers. For example, one bit may include 12 subcarriers, and in this case, one bit in one slot implies one PRB of LTE rel-8. By using the bin to limit the resource granularity for opportunistic MU-MIMO, orthogonality between reference signals transmitted by a plurality of UEs can be maintained.

4) Transmission of Contention-Based Uplink Signal Through Reserved Resource

A contention-based uplink signal can be transmitted through a time or frequency domain either predetermined or determined by being triggered by other factors. In particular, a specific component carrier (CC) can be used for contention-based uplink transmission in a carrier aggregation system.

A single subcarrier reserved in the frequency domain or a subcarrier group including a plurality of subcarriers can be used for the contention-based uplink transmission. The reserved frequency domain can be determined by cell-specific or UE-specific RRC signaling. Alternatively, the single SC-FDMA symbol reserved in the time domain or the SC-FDMA symbol group including the plurality of SC-FDMA symbols can be used for the contention-based uplink transmission. The reserved time domain can also be determined by the cell-specific or UE-specific RRC signaling. In addition, the UE can randomly select a specific reserved zone among reserved zones to decrease collision among a plurality of UEs.

5) Method of Performing Scheduled Contention-Based Uplink Transmission

An allocated resource, a transmission mode, or control information (e.g., PMI, RI, or the like in use) can be signaled through a predetermined zone or resource. A BS can detect and decode by using the predetermined zone or resource, and thereafter can decode a transmission mode and a correct resource location transmitted from a UE on the basis of the control information. That is, the transmission mode or related parameters can be determined by the UE. Accordingly, the BS can detect a contention-based uplink signal without additional blind decoding. In addition, the UE can transmit uplink data in an optimal channel state according to a transmission mode determined by the UE.

Figure 26:
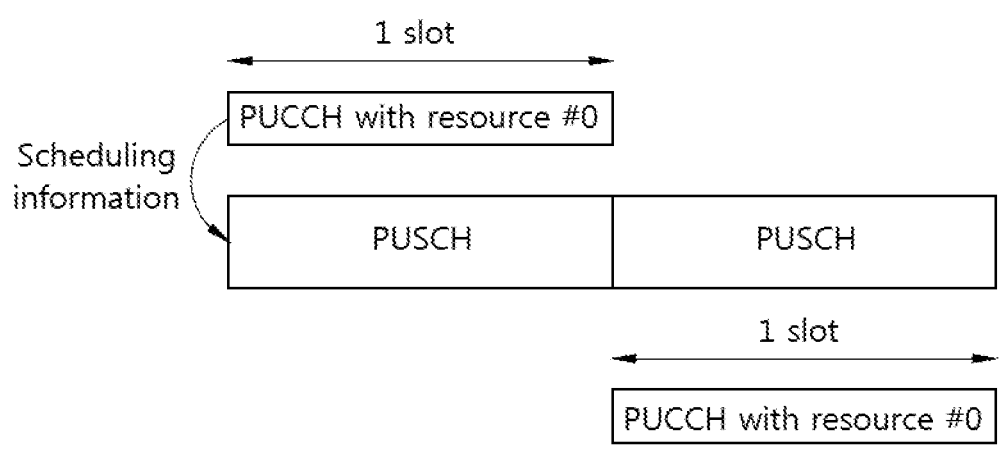
FIG. 26 is an embodiment of a method of performing scheduled contention-based uplink transmission.

FIG. 26 is an embodiment of a method of performing scheduled contention-based uplink transmission. The embodiment of FIG. 26 is a case where a PUCCH is a predetermined zone or resource when the PUCCH and a PUSCH are transmitted simultaneously from one UE. In a 1$^{st}$ slot, an allocated resource, a transmission mode, and scheduling control information (e.g., PMI or RI) are transmitted through a PUCCH based on a radio resource #0. A contention-based uplink signal is transmitted through the PUSCH scheduled corresponding thereto.

Figure 27:
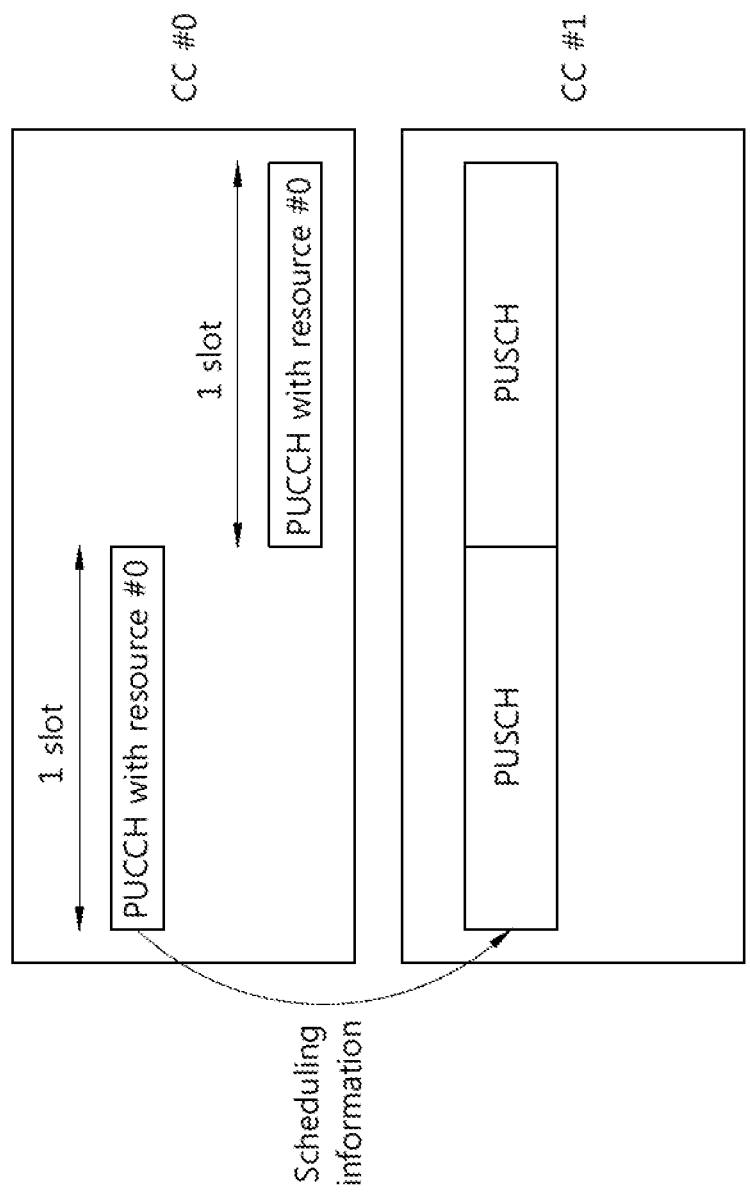
FIG. 27 shows another embodiment of a method of performing scheduled contention-based uplink transmission.

FIG. 27 shows another embodiment of a method of performing scheduled contention-based uplink transmission. The proposed method can be applied to a carrier aggregation system. It is assumed that a UE supports a carrier aggregation system including two component carriers. Referring to FIG. 27, scheduling control information for contention-based uplink transmission is transmitted through a PUCCH of a $1^{st}$ component carrier (or CC #0). Scheduled buffer status signals and data corresponding to the scheduling control information are transmitted through a PUSCH of a second component carrier (or CC #1). Accordingly, the scheduled contention-based uplink transmission can be performed in the carrier aggregation system.

By performing the scheduled contention-based uplink transmission, a collision possibility can be minimized among UEs, and a size of a payload to be transmitted can be increased. Since the BS detects the scheduled control information, a channel can be optimized such that a collision of UEs is minimized and detection performance is maximized. When scheduling control information is successfully detected, it can be transmitted through the maximum possible resources to which the buffer status signal and data are scheduled. In addition, when a signal is transmitted by a different radio frequency (RF) unit in each component carrier, it is possible to obtain an effect of decreasing a CM.

Meanwhile, although it is shown in the embodiment of FIG. 26 and FIG. 27 that scheduling control information and a payload are transmitted in one subframe, the scheduling control information and the payload can be transmitted in different subframes. For example, the scheduling control information transmitted through the PUCCH of FIG. 26 and FIG. 27 can be transmitted in a subframe n, and the payload transmitted through the PUSCH can be transmitted in a subframe n+a. For example, a=1. Alternatively, the scheduling control information and the payload can be transmitted in different slots or different SC-FDMA symbols.

6) Cyclic Shift Reservation

At least one of a DMRS and a cyclic shift value can be reserved for a contention-based uplink usage in contention-based uplink transmission through a PUSCH. For example, if it is assumed that the number of available cyclic shift values is 12 (from 0 to 11), four cyclic shift values can be reserved for contention-based uplink transmission. Accordingly, channel estimation performance can be improved when a scheduled UE and a UE for performing contention-based uplink transmission use the same PRB or the same frequency band. In addition, opportunistic MU-MIMO can be applied when the scheduled UE and the UE for performing contention-based uplink transmission use different cyclic shift values. As a result, spatial multiplexing is performed, and thus all of signals transmitted by the scheduled UE and the UE for performing contention-based uplink transmission can be successfully decoded. Meanwhile, the cyclic shift reservation can also be applied to a PRB shared between the scheduled UE and the UE for performing contention-based uplink transmission.

Figure 28:
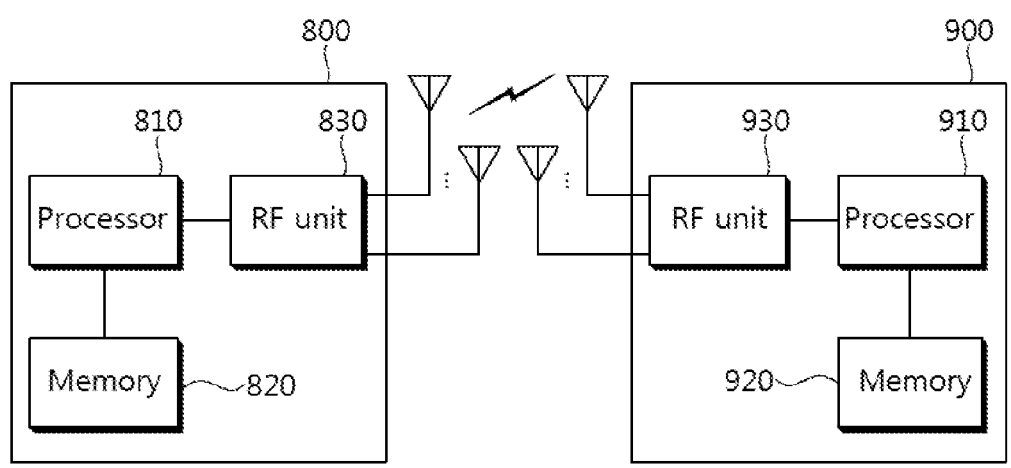
FIG. 28 is a block diagram showing a base station and a user equipment to implement an embodiment of the present invention.

FIG. 28 is a block diagram showing a base station and a user equipment to implement an embodiment of the present invention.

A base station 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A state transition method performed by a user equipment (UE) in a wireless communication system, the method comprising:
    transmitting, to a base station, a contention-based uplink (UL) signal including at least one of a buffer status signal and UL data in a state where a scheduling request (SR) is not transmitted;
    receiving a UL grant from the base station if the contention-based UL signal is successfully detected by the base station;
    receiving an acknowledgment (ACK)/non-acknowledgement (NACK) from the base station in response to the contention-based UL signal, the ACK/NACK being received through a physical hybrid ARQ indicator channel (PHICH), the ACK/NACK being received by being included in the UL grant, a resource of the PHICH for the transmission of the ACK/NACK being allocated by using a cell specific radio resource control (RRC) signaling, a UE specific RRC signaling, or a dynamic PDCCH signaling, the resource of the PHICH being determined based on a lowest physical resource block (PRB) index in a resource allocation of a physical uplink shared channel (PUSCH) and a cyclic shift value of a reference signal (RS) that is transmitted using the UL grant, the resource of the PHICH being expressed by an index pair that is determined by:

$$n_{PHICH}^{group} = (I_{PRB\_RA}^{lowest\_index} + n_{DMRS}) \mod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \mod 2N_{SF}^{PHICH},$$

where $n_{DMRS}$ is determined based on a cyclic shift for DMRS field in a DCI format; and transitioning from a dormant state to an active state on the basis of the UL grant, wherein the dormant state is a state in which a radio resource control (RRC) connection is established between the base station and the user equipment, but data is not actually transmitted, and wherein the active state is a state in which the RRC connection is established between the base station and the user equipment, and data can be transmitted or received between the base station and the user equipment.

2. The method of claim 1, wherein the contention-based UL signal is transmitted through a physical uplink control channel (PUCCH).

3. The method of claim 2, wherein the contention-based UL signal is transmitted through the PUCCH on a basis of a PUCCH format 2.

4. The method of claim 1, wherein the contention-based UL signal is transmitted through the PUSCH.

5. The method of claim 1, further comprising transmitting the RS to detect the contention-based UL signal of the base station.

6. The method of claim 1, wherein the contention-based UL signal is transmitted through a resource reserved in a time domain or a frequency domain.

7. A user equipment (UE), comprising:

a radio frequency (RF) unit configured for transmitting or receiving a radio signal; and a processor coupled to the RF unit, the processor being configured for:

transmitting, to a base station, a contention-based uplink (UL) signal including at least one of a buffer status signal and UL data in a state where a scheduling request (SR) is not transmitted;

receiving a UL grant from the base station if the contention-based UL signal is successfully detected by the base station;

receiving an acknowledgment (ACK)/non-acknowledgement (NACK) from the base station in response to the contention-based UL signal, the ACK/NACK being received through a physical hybrid ARQ indicator channel (PHICH), the ACK/NACK being received by being included in the UL grant, a resource of the PHICH for the transmission of the ACK/NACK being allocated by using a cell specific radio resource control (RRC) signaling, a UE specific RRC signaling, or a dynamic PDCCH signaling, the resource of the PHICH being determined based on a lowest physical resource block (PRB) index in a resource allocation of a physical uplink shared channel (PUSCH) and a cyclic shift value of a reference signal (RS) that is transmitted using the UL grant, the resource of the PHICH being expressed by an index pair that is determined by:

$$n_{PHICH}^{group} = (I_{PRB\_RA}^{lowest\_index} + n_{DMRS}) \mod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \mod 2N_{SF}^{PHICH},$$

where $n_{DMRS}$ is determined based on a cyclic shift for DMRS field in a DCI format; and transitioning from a dormant state to an active state on the basis of the UL grant, wherein the dormant state is a state in which a radio resource control (RRC) connection is established between the base station and the user equipment, but data is not actually transmitted, and wherein the active state is a state in which the RRC connection is established between the base station and the user equipment, and data can be transmitted or received between the base station and the user equipment.

* * * * *